US012254810B2

(12) United States Patent
Pfeiffer

(10) Patent No.: US 12,254,810 B2
(45) Date of Patent: Mar. 18, 2025

(54) DIAGONAL ADDRESSING OF ELECTRONIC DISPLAYS

(71) Applicant: New Vision Display, Inc., Roseville, CA (US)

(72) Inventor: Matthias T. Pfeiffer, Boulder, CO (US)

(73) Assignee: New Vision Display, Inc., Roseville, CA (US)

( * ) Notice: Subject to any disclaimer, the term of this patent is extended or adjusted under 35 U.S.C. 154(b) by 0 days.

(21) Appl. No.: 18/388,401

(22) Filed: Nov. 9, 2023

(65) Prior Publication Data

US 2024/0078957 A1 Mar. 7, 2024

Related U.S. Application Data

(63) Continuation of application No. 17/511,948, filed on Oct. 27, 2021, now Pat. No. 11,842,667.

(51) Int. Cl.

*G09G 3/20* (2006.01)
*G09G 3/34* (2006.01)
*G09G 3/36* (2006.01)

(52) U.S. Cl.

CPC ........... *G09G 3/2085* (2013.01); *G09G 3/344* (2013.01); *G09G 3/3611* (2013.01); *G09G 2300/0426* (2013.01); *G09G 2300/06* (2013.01); *G09G 2300/08* (2013.01); *G09G 2310/0202* (2013.01); *G09G 2310/0278* (2013.01); *G09G 2310/08* (2013.01); *G09G 2320/0285* (2013.01)

(58) Field of Classification Search

CPC .... G09G 3/2085; G09G 3/344; G09G 3/3611; G09G 2300/0426; G09G 2300/06; G09G 2300/08; G09G 2310/0202; G09G 2310/0278; G09G 2310/08; G09G 2320/0285

See application file for complete search history.

(56) References Cited

U.S. PATENT DOCUMENTS

| | | | | |
|---|---|---|---|---|
| 10,197,831 B1 * | 2/2019 | Street | G09G 3/035 | |
| 11,468,847 B2 * | 10/2022 | Kim | G09G 3/20 | |
| 2006/0290646 A1 * | 12/2006 | Kang | G02F 1/1345 | 345/100 |
| 2006/0290649 A1 * | 12/2006 | Johnson | G09G 3/344 | 345/107 |
| 2008/0198098 A1 * | 8/2008 | Gelbman | G06F 3/147 | 345/59 |
| 2009/0058782 A1 * | 3/2009 | Watanabe | G09G 3/3614 | 345/94 |
| 2015/0049068 A1 * | 2/2015 | Liao | H04N 13/337 | 345/206 |
| 2022/0028344 A1 * | 1/2022 | Kim | G09G 3/3266 | |
| 2022/0415262 A1 * | 12/2022 | Kim | G09G 3/3275 | |

* cited by examiner

*Primary Examiner* — Michael Pervan

(74) *Attorney, Agent, or Firm* — Weintraub Tobin; Jo Carothers

(57) ABSTRACT

The present disclosure relates to electronic displays and display components, specifically to a method of addressing more pixels with a smaller number of driver outputs while also allowing very narrow frames on three sides of a display. It further discloses a display driver integrated circuit capable of providing the signals required for the disclosed addressing method and display systems capable of being addressed by the disclosed method and display driver integrated circuit.

8 Claims, 23 Drawing Sheets

Electronic Display with a Display Driver Integrated Circuit Addressing Method *2300*

DIAGONAL ADDRESSING OF ELECTRONIC DISPLAYS

FIELD OF THE INVENTION

The present invention and disclosure relate to electronic displays and display components.

BACKGROUND OF THE INVENTION

Electronic displays are composed of picture elements called pixels usually arranged in an X by Y array forming X columns and Y rows. The total number of pixels is X*Y. Rows and columns are addressed with different drivers. In passive matrix displays, rows are addressed with 'common' or COM drivers while columns are addressed with 'segment' or SEG drivers. In active matrix displays, rows are addressed with gate drivers while columns are addressed with data drivers.

In either case the row and column drivers provide different signals at their respective outputs. Generally common drivers and gate drivers scan one or more image independent selection pulses across the outputs, while in segment drivers and data drivers all outputs are active simultaneously with different output levels depending on image content.

Some displays also have graphic array symbology, such as battery or antenna strength symbols, called icons. These icons are arranged electronically in rows and columns as well, even if they are not positioned in a Cartesian grid as with pixels. The number of outputs required for the common drivers or gate drivers equals the number of rows (X). The number of outputs required for the segment drivers or data drivers equals the number of columns (Y). Thus, the total number of outputs required is (X+Y). In some cases, especially for smaller displays, the row and column driver functionality can be combined onto one integrated circuit ("IC") having sections of row and column drivers.

Display drivers are pad limited, meaning the size of the silicon chip is determined by the number of inputs and outputs on the integrated circuit. In other words, the silicon area would allow more complex computations than needed, because it has room for a significantly larger number of transistors and other electronic components. For a given set of design rules, the cost of a silicon chip is essentially the cost of processing a wafer divided by the number of chips that fit on that wafer. Therefore, and due to the pad limitation, the cost of a display driver is higher than warranted by the complexity of the functions it performs. An electronic display design and layout that can address a given number of pixels with a smaller number of driver outputs would be desirable, as this would reduce the cost of the integrated circuits.

It is also desirable for electronic displays to have narrow frames, which leads to displays having active image areas that reach as close as possible to the edge of the display. However, connecting row drivers and column drivers to the respective rows and columns and to their support electronics requires additional space for attaching these drivers. Rows may be addressed from the left or right side of the display while columns may be addressed from the top or bottom. This means the frame at either the top or bottom and at either the right or left side needs to be wider to accommodate space for the drivers. To reduce the frame size in smaller displays the row signals are often brought around to the bottom edge or top edge, so that only one side of the display needs to accommodate the extra room for the driver ICs. However, this technique still requires additional room for all the traces connecting the row driver outputs of an IC located at a column edge with their respective rows.

To further reduce the distance between the image edge and the left and right side of the display, some active-matrix displays have been developed where the row driver functionality has been implemented in the active matrix itself. In these designs the row drivers are still located at the left and right edge but require less space than what would be needed to connect each row individually.

In other designs, some of the row driver functionality is distributed throughout the panel, e.g., in the gaps between the pixels, thereby allowing a further reduction of the distance between image edge and display edge. These so called "Frameless Display" designs are limited to active matrix displays only and have complicated circuitry on the active-matrix panel and require use of low temperature polysilicon (LPTS) or oxide technology, which allows higher levels of integration compared to amorphous silicon designs.

A layout comprising a plurality of conductive elements arranged in a diagonal pattern such that one group of conductive elements follows one diagonal while another group of conductive elements follows another diagonal for the use of capacitive touch sensing has been described in U.S. Pat. No. 10,534,487 (the "'487 Patent"). The '487 Patent teaches that when such conductive elements reach the left or right side, they are reflected at the edge of the touch sensor and then follow the other diagonal until reaching the top of the touch sensor. These conductive elements form nodes within the active area of the touch sensor. Touch sensing comprises measuring the capacitance at these nodes and determining from a change in capacitance the presence (or absence) of a finger. Due to the bending of the traces at the right and left side, all traces can be connected from the bottom edge and no extra space is needed for traces running up and down the sides. This allows for touch panels that can sense a finger presence very close to their edge on three of the four sides.

The '487 Patent further teaches that disambiguation techniques are required in capacitive touch sensing, and that these techniques can be used to identify one or multiple finger locations. It further teaches that, depending on a finger position, several conductive elements may respond simultaneously with different intensity to the presence of a finger and in different methods of capacitive sensing. While this kind of a layout is possible and advantageous for capacitive touch sensing, it is not readily applicable for driving displays as neither ambiguity nor effects on other lines (cross talk) are acceptable for displays.

BRIEF SUMMARY OF THE INVENTION

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

An electronic display must drive each pixel to an exact target state, without impacting the other pixels in the display. The present invention discloses a diagonal arrangement of driving electrodes that can be used for driving electronic displays, while preserving the advantages of not needing electrode traces running up and down the sides of a display and simultaneously requiring a smaller number of driver outputs per number of pixels in the array.

In diagonal addressing the display is addressed in a progressive scan method. At the beginning of a frame for a given amount of time, one output applies the common signal, while all other outputs apply either a segment signal or a no-data signal. After that first time period a second output applies the common signal while all other outputs apply new segment or no-data signals. This process continues until all outputs have been scanned with the common signal. The sequence in which the outputs are scanning the common signal may go from left to right, from right to left, either in sequence or by odd and even numbers, or first odd from left to right followed by even from right to left, etc. Any sequence is acceptable as long as each output applies the common signal once per frame time. A common signal is typically a voltage pulse with a higher voltage, while the segment signal is typically a smaller voltage with the same or opposite polarity, which is either added to or subtracted from the common pulse. Any segment outputs that have no pixels in common with common output apply a no-data signal. The no-data signal can be any voltage, such as it may suitably be 0V, or it could be a high impedance state of the output.

As disclosed herein, this requires hybrid display drivers that have outputs being able to switch between no output, acting as a row driver, and acting as a column diver, bridging the electrodes that drive the display from one substrate to the other, while maintaining control of the polarity of the signals applied to the pixel, and specific display media properties. The display media, e.g., the liquid crystal, must have a threshold under which it does not respond to the stimulus and very steep response to the stimulus. Alternatively, an insufficient threshold or steepness of the display medium can be overcome by adding active elements in the array that create a steep response and/or a threshold. Such active elements may be transistors or diodes.

An electronic display design and layout, a method of addressing the display, and drivers capable of implementing this method are also disclosed. This disclosure and invention allow for addressing all pixels from only one side of the display and thereby allowing very narrow frames while also reducing the number of necessary driver outputs per pixels, and thus reducing driver size and associated cost. The present invention discloses the design and layout, the addressing method, as well as the specific requirements for display drivers of electronic displays, which allow reduction of the number of driver outputs required to drive a given number of pixels, while also allowing a reduction of the frame width on three sides of the displays. The method is applicable to active and passive matrix displays, to LCDs, electrophoretic displays, OLED displays, as well as other displays.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

The following is a detailed description of various embodiments to illustrate the principles of the invention. The embodiments are provided to illustrate aspects of the invention, but the invention is not limited to any embodiment. The scope of the invention encompasses numerous alternatives, modifications, and equivalents. The scope of the invention is limited only by the claims.

While numerous specific details are set forth in the following description to provide a thorough understanding of the invention, the invention may be practiced according to the claims without some or all of these specific details.

Various embodiments will be described in detail with reference to the accompanying drawings. Wherever possible, the same reference numbers are used throughout the drawings to refer to the same or like parts. References made to particular examples and implementations are for illustrative purposes and are not intended to limit the scope of the claims.

For purposes of the detailed description of the present invention, the method of addressing a display using the present invention is referred to as "diagonal addressing". To differentiate between the present invention and prior art, the addressing of a display not using the present invention is referred to as "standard addressing" or "Cartesian addressing". The pixel layout and interconnection used for diagonal addressing according to the present invention is referred to as "diagonal pixel layout" in contrast to the prior art which is referred to as "standard pixel layout" or "Cartesian layout." A standard pixel layout or Cartesian layout with respect to the pixel layout shall mean pixels are defined by substantially parallel lines forming intersecting horizontal rows and vertical columns of pixels, intersecting each other substantially at a right angle, where a pixel can be defined uniquely by its row and column position.

Figure 1:
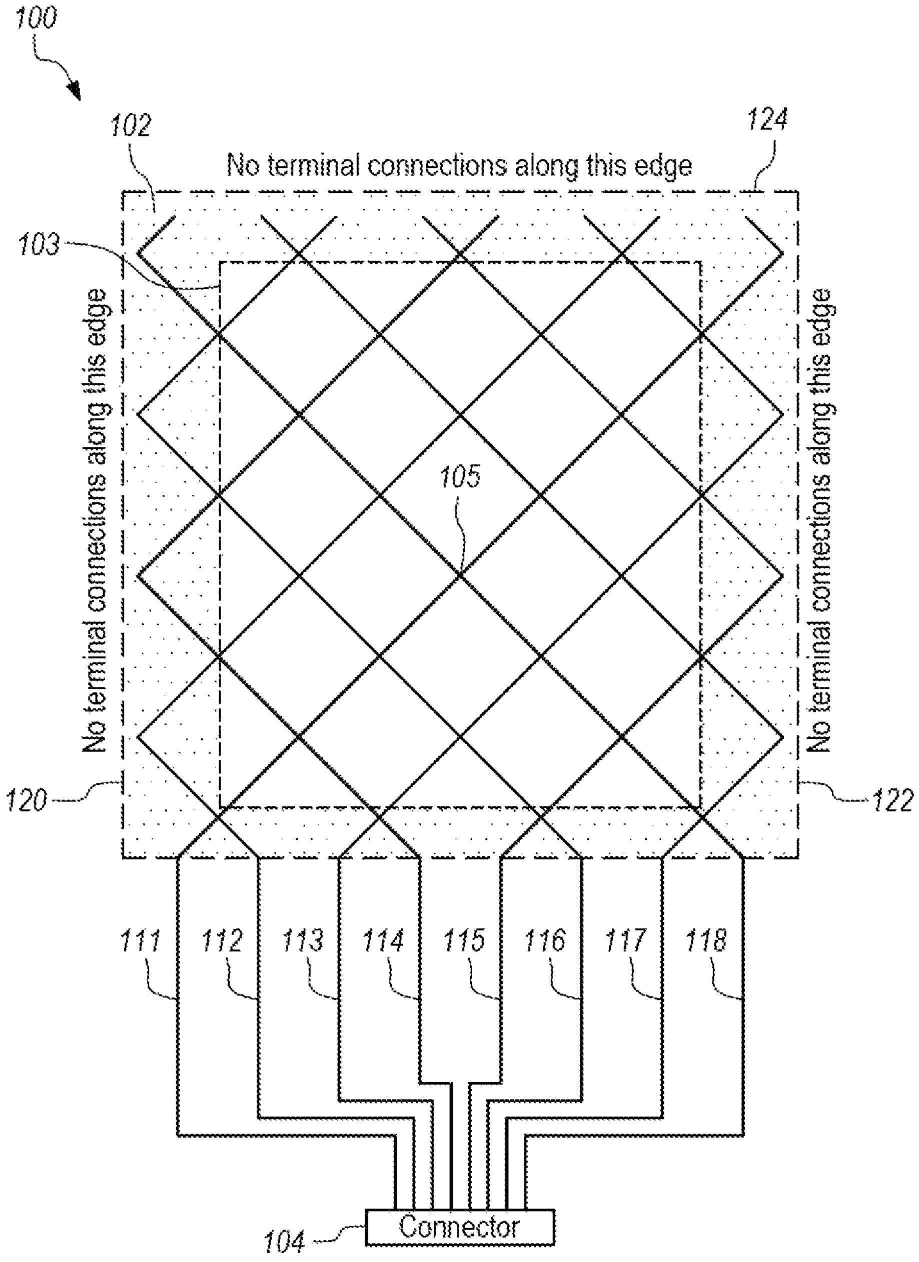
FIG. 1 (Prior Art)
FIG. 1 shows a touch sensor according to prior art.

FIG. 1 shows prior art touch sensor 100 according to the '487 Patent comprising a plurality of conductive elements 111, 112, 113, 114, 115, 116, 117, and 118 connected to connector 104 arranged in a diagonal pattern such that one group of conductive elements (i.e., 111, 113, 115, and 117) follows one diagonal while another group of conductive elements (i.e., 112, 114, 116, 118) follows another diagonal. When conductive elements 111, 112, 113, 114, 115, 116, 117, and 118 reach the left side 120 or right side 122 of the touch sensor 100, conductive elements 111, 112, 113, 114, 115, 116, 117, and 118 bend in area 102 to follow the other diagonal until reaching the top 124 of the touch sensor 100.

The conductive elements 111, 112, 113, 114, 115, 116, 117, and 118 form nodes 105 at their intersection within central area 103. The central area 103 is the active area of touch sensor 100. The '487 Patent teaches that such layout has the advantages of less terminal connections per node and lack of "feed lines", which are the connections running up and down the sides 120 and 122 of touch sensor 100 having horizontally and vertically arranged conductive elements 111, 112, 113, 114, 115, 116, 117, and 118.

The '487 Patent further teaches the need for disambiguation techniques in capacitive touch sensing and that such techniques can be used to identify one or multiple finger locations. It further teaches that, depending on a finger position, several conductive elements 111, 112, 113, 114, 115, 116, 117, and 118 may respond simultaneously and with different intensity to the presence of a finger in various methods of capacitive sensing, such as self-capacitive and mutual-capacitive sensing.

While this kind of a layout is possible and advantageous for capacitive touch sensing, it is not readily applicable for driving displays as neither any form of ambiguity nor effects on other lines are acceptable for displays. Ambiguity would lead to an incorrect image representation, while effects on other lines would lead to cross talk. An electronic display cannot make use of disambiguation and hence must drive each pixel to an exact target state, without impacting the other pixels in the display.

Figure 2:
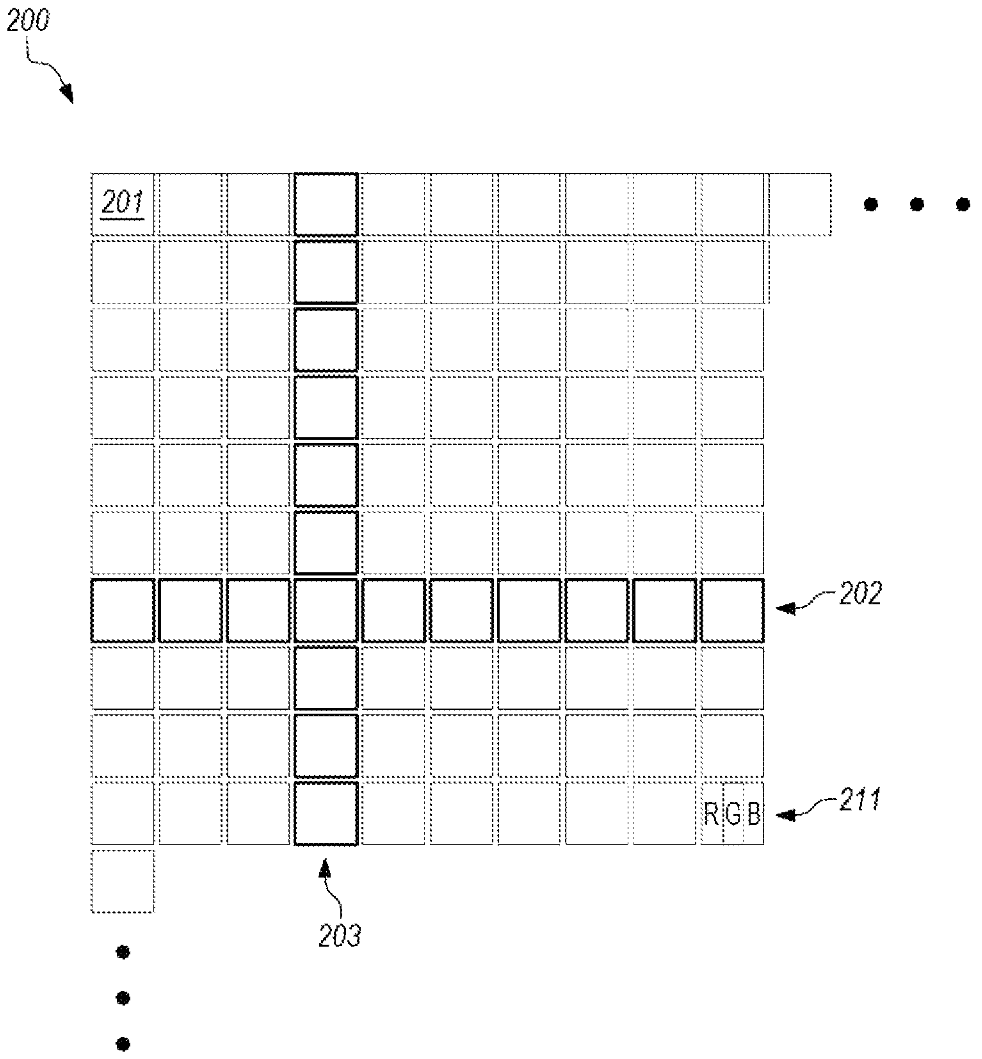
FIG. 2 (Prior Art)
FIG. 2 shows a typical pixel layout of a prior art display.

FIG. 2 shows a typical pixel layout 200 for a prior art monochrome electronic display. Square picture element pixels 201 are arranged in a Cartesian grid to form rows 202 and columns 203 of square pixels 201. The square pixels 201 are oriented parallel to the grid axes. In this illustration a square area with only ten rows 202 and ten columns 203 is shown. This may be a portion of a larger array with many more rows 202 and columns 203. The pixel layout 200 as described above may further be subdivided into color sub-pixels. For example, it is common practice to subdivide a square pixel 201 into three vertical stripes of red, green, and blue colored sub-pixels 211 as illustrated in FIG. 2. Pixels 201 can have other shapes as well or be subdivided in more than three sub-pixels 211. Common to all these layouts is that pixels 201 are defined and addressed by substantially horizontal rows 202 and substantially vertical columns 203.

Figure 3:
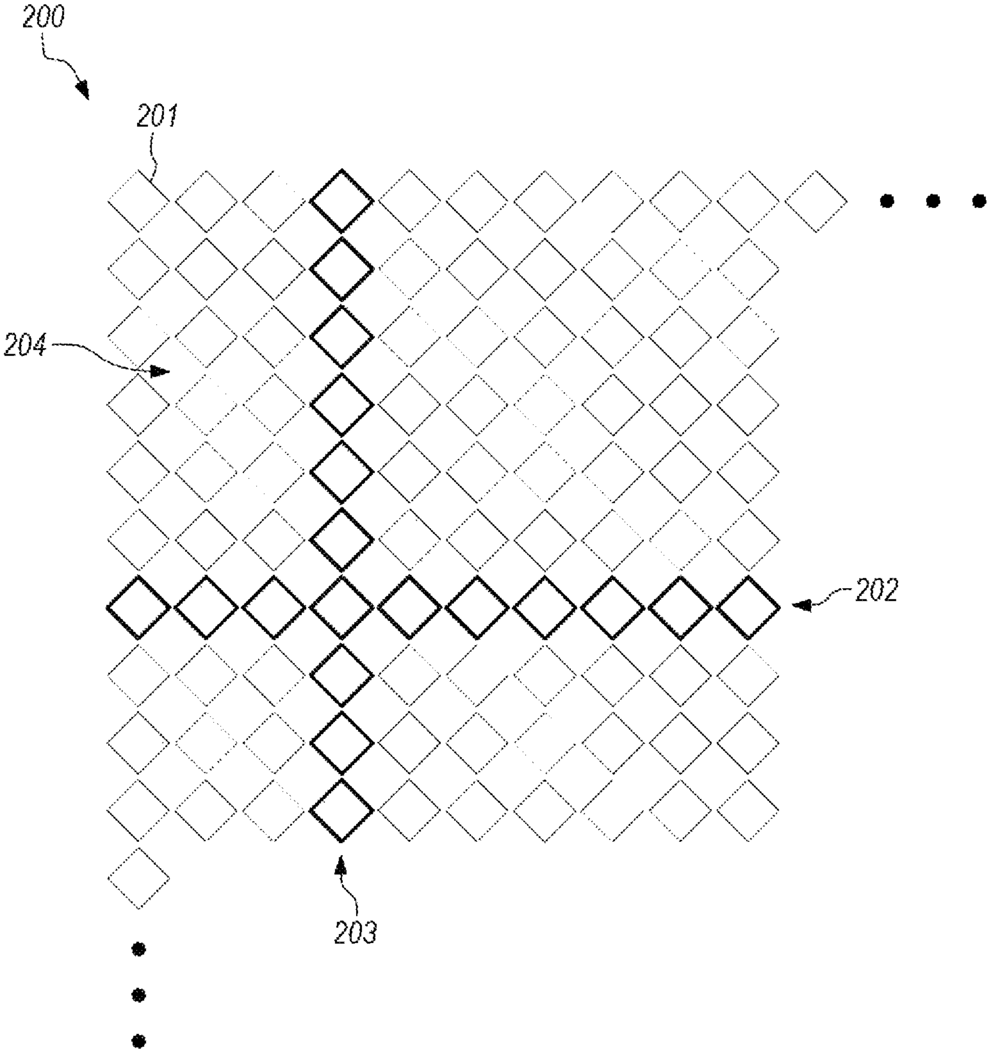
FIG. 3 shows an alternate pixel layout.

FIG. 3 shows the same pixel layout 200 where the square pixels 201 are resized and rotated by forty-five degrees. This leaves holes 204 in the pixel layout 200.

Figure 4:
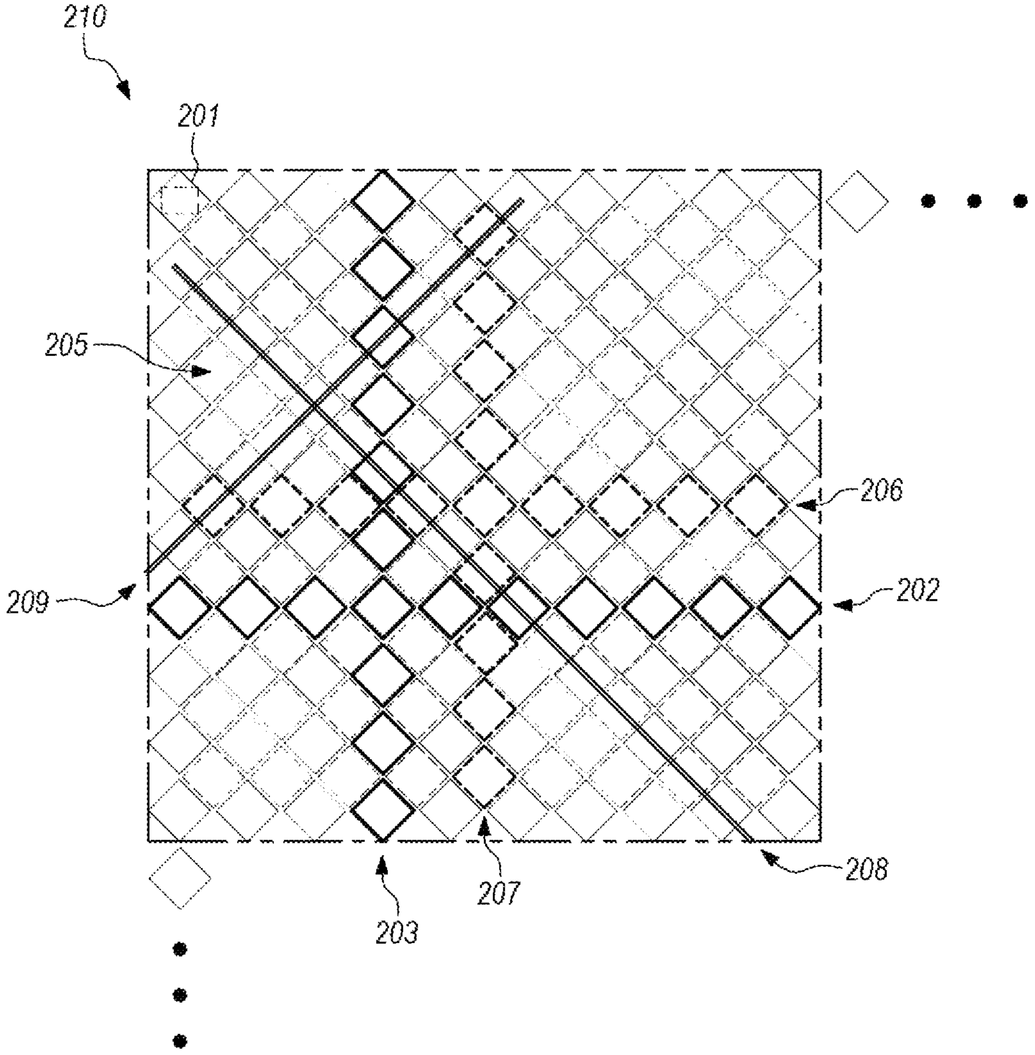
FIG. 4 shows another pixel layout.

FIG. 4 shows a diagonal pixel arrangement 210 where the holes 204 are filled in with additional pixels 205 to completely fill the diagonal pixel arrangement 210 with as many total pixels 201 and 205 as possible. For the illustrated ten rows 202 by ten columns 203 area with one-hundred original pixels 201, eighty-one additional pixels 205 can be fitted into the array as a result of resizing and rotating the square pixels 201 by forty-five degrees. In general, for N rows 202 and M columns 203, the number of additional pixels 205 (Pa) is given by $$Pa=(N-1)\times(M-1) \quad (1)$$

Figure 5:
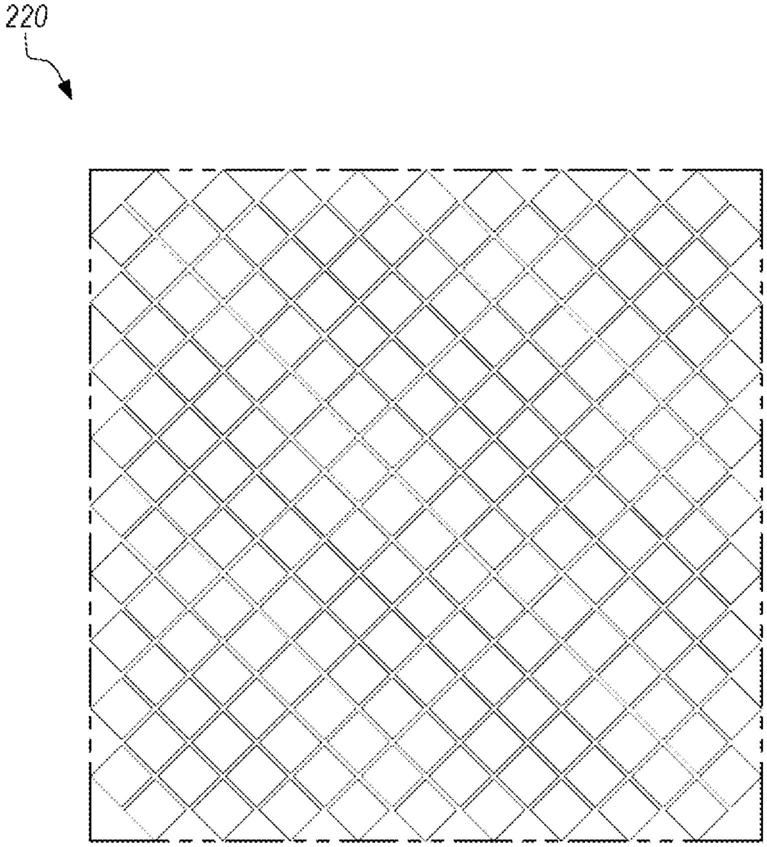
FIG. 5 illustrates a variation of the pixel layout of FIG. 4.

In such a diagonal pixel arrangement 210, two principal variations exist. FIG. 5 shows an alternative arrangement 220 of the same size pixels 201 and 205 in the same size area. However, this arrangement 220 can fit one less pixel than prior arrangement 210. Either layout or a combination can be used, but the following descriptions of the invention shall be limited for simplicity reasons to the layout 210 of FIG. 4, without limiting the scope of the invention to that layout. Common to the layout in FIGS. 4 and 5 is that the additional pixels 205 must be electrically connected to the edge of the display. This can either be done without the benefit of this invention by adding additional rows 206 and additional columns 207, or by using traces 208 and 209 connecting the pixels diagonally, which leads to benefits of this invention.

In the following sections for simplicity, the concept of the invention will be explained on the simplest case of a monochrome passive matrix liquid crystal display. However, the invention is in no way limited to the case of monochrome passive matrix displays. For example, the invention applies to color displays and to active matrix displays as well.

Figure 6:
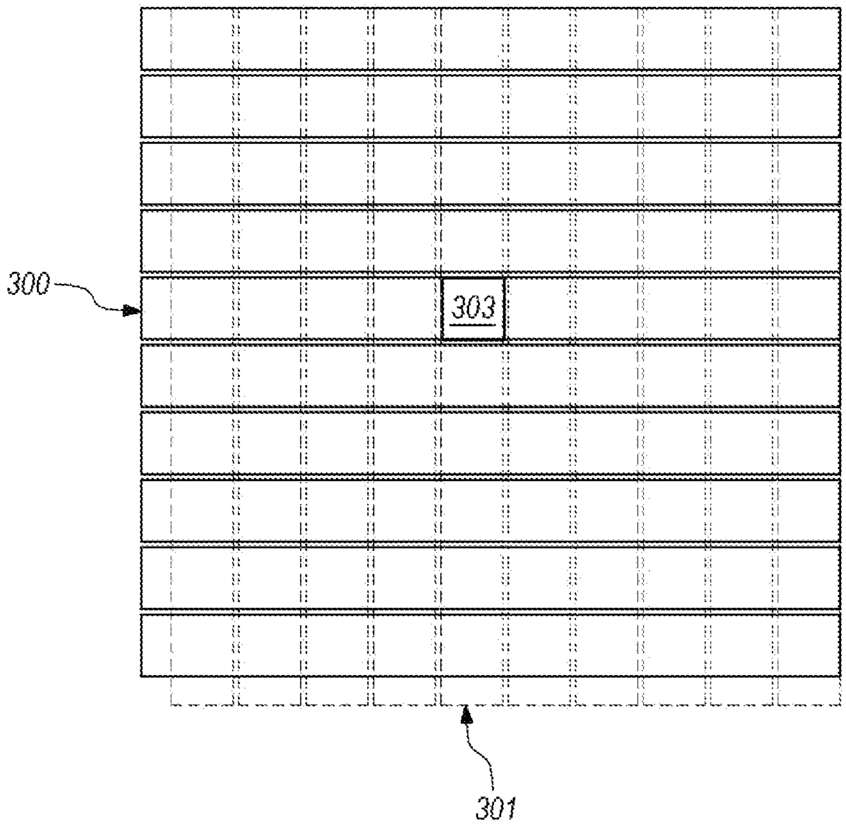
FIG. 6 (Prior Art)
FIG. 6 shows a prior art pixel defined by the crossover of a row and a column.
Figure 7:
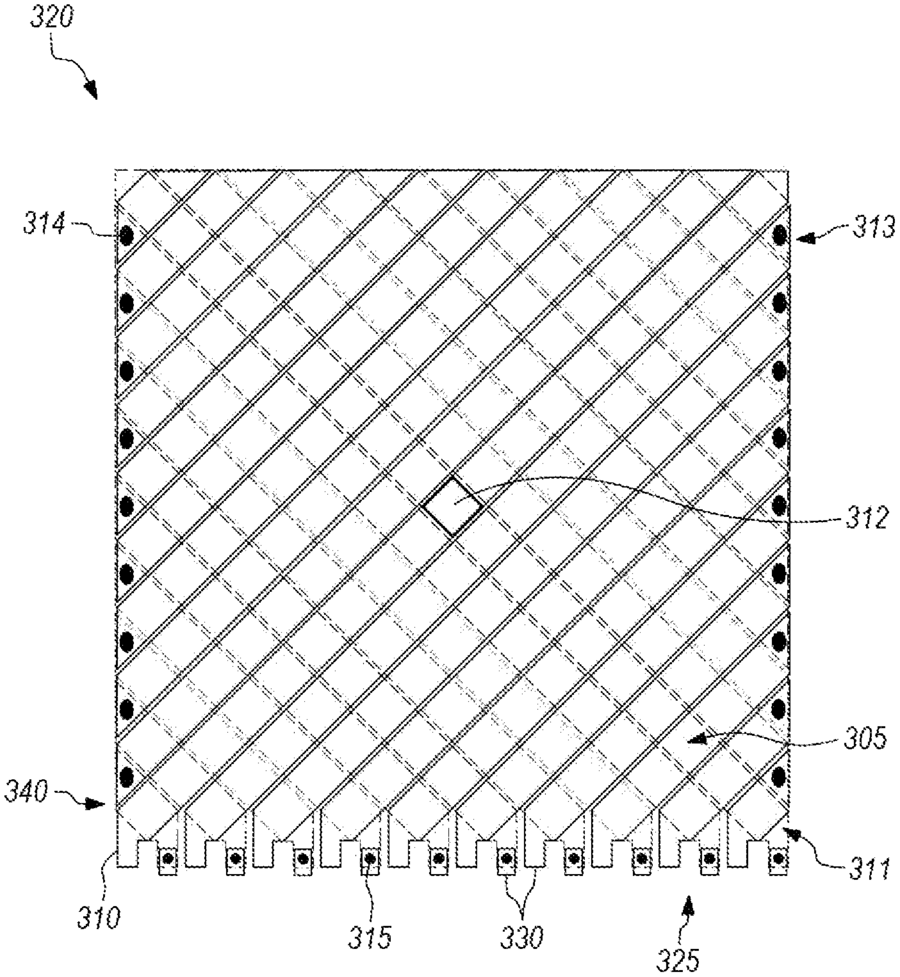
FIG. 7 shows a pixel defined by the crossover of two diagonal electrodes.

In the simplest case of a monochrome passive matrix display, the prior art array of FIG. 2 can be formed by overlapping row traces 300 and column traces 301 on either side of the liquid crystal layer as shown in FIG. 6, forming the pixel capacitors that activate the liquid crystal. The row traces 300 can be on one substrate and are connected on the left, while the column traces 301 are on the other substrate and are connected from the bottom. Pixels 303 are formed by the overlapping area of a row 300 and a column 301. The same can be done with the diagonal layout of FIG. 4 only here the electrode traces must be arranged diagonally on the panel as illustrated in FIG. 7. Diagonal traces 305 on first substrate 310 are along the diagonal from lower left to upper right. Diagonal traces 305 on the second substrate 311 are along the diagonal from lower right to upper left. Where two diagonal traces 305 cross, a pixel 312 is formed by the overlap area. All diagonal traces 305 are connected from the bottom. All diagonal traces 305 on either first substrate 310 or second substrate 311 must reflect at the edges 313 and 340 and continue in the other diagonal on the opposite substrate when they reach either side of the array. This can be achieved with conductive crossover contacts 314 that bridge the cell gap of the display. Preferably, further conductive crossover dots 315 are arranged at the bottom edge 325 so that all traces can be connected on the same substrate.

An integrated driver circuit (not shown) attached to the bottom edge 325 provides both the row and column driver functionality in such a way that each driver output is capable of providing the scanning row signal and while it is not scanning it provides the data signal to the display contacts 330. Further, depending on the aspect ratio of the array, each driver output provides a reference voltage or a high impedance state as it may not address any existing pixels 312 during a given time slot.

The layout and electrode arrangement 320 of FIG. 7 can be used for square displays and displays with aspect ratio (horizontal dimension/vertical dimension) greater than one. This means landscape format, not portrait format assuming the contacts are on the top or bottom edge. In other words, the contacts must always be on one of the longer sides. This limitation is caused by the requirement to eliminate two pixels being addressed by the same pair of driver outputs.

Further referring to FIG. 7, there are neither contacts to driver integrated circuits on the edge 313 and 340, nor are there a multitude of parallel traces connecting row electrodes with a driver located at the top or bottom of the display. All that is required are the crossover spots and space for the perimeter seal that seals the two substrates together. In typical displays such electrical crossover is achieved by adding conductive particles (i.e., polymer spheres coated with nickel and gold) into the perimeter seal. Therefore, no additional space is required other than the space needed for the perimeter seal. This is the case for three sides of the display and hence allows the design of "frameless displays".

FIG. 7 also illustrates that the number of display contacts 330 and hence the number of driver outputs required is twice the number of pixels 312 along the edge 340. In this example two times ten pixels 312 means twenty driver outputs. For a square display with one hundred and eighty-one pixels 312 using standard addressing, the number of display contacts 330 and hence driver outputs would be two times the square root of one-hundred eighty-one, which equals twenty-seven driver outputs. In reality, the closest display would have to be not quite square with thirteen rows times fourteen columns, which equals one-hundred and eighty-two pixels 312.

The new layout allows driving an almost identical number of pixels 312 with twenty-six percent less driver outputs. As mentioned above, display drivers are pad limited. As most outputs are arranged along the long edge of a driver, twenty-six percent less outputs means a driver that is approximately twenty-six percent shorter and hence requires approximately twenty-six percent less silicon area. It means more drivers per silicon wafer and a lower cost per driver.

The same advantage can be expressed as a gain in the number of pixels 312 for a given number of display contacts 330. In the example of ten rows 202 plus ten columns 203, which equals twenty display contacts 330 as shown in FIG. 2 and FIG. 4, one hundred and eighty-one pixels 312 can be addressed respectively, an eighty-one percent (81%) gain when using the diagonal addressing scheme.

The gain in addressable pixels 312 for diagonal addressing compared to standard addressing increases with an increasing number of pixels 312 and approaches one-hundred percent (100%) asymptotically for displays with an aspect ratio of one (square displays). This gain is a function of the aspect ratio. If (Xr) and (Yr) are the number of columns and rows in standard layout, (Xd) is the number of pixels in the row that is connected to the driver, and (Yd) is the number of pixels in the first column with a pixel that is connected to a driver, then the gain (or loss) in the number of Pixels (Gpix) is given by:

$$Gpix = \frac{Xd*Yd+(Xd-1)*Yd-1)}{Xr*Yr}-1 \quad (2)$$

Figure 8:
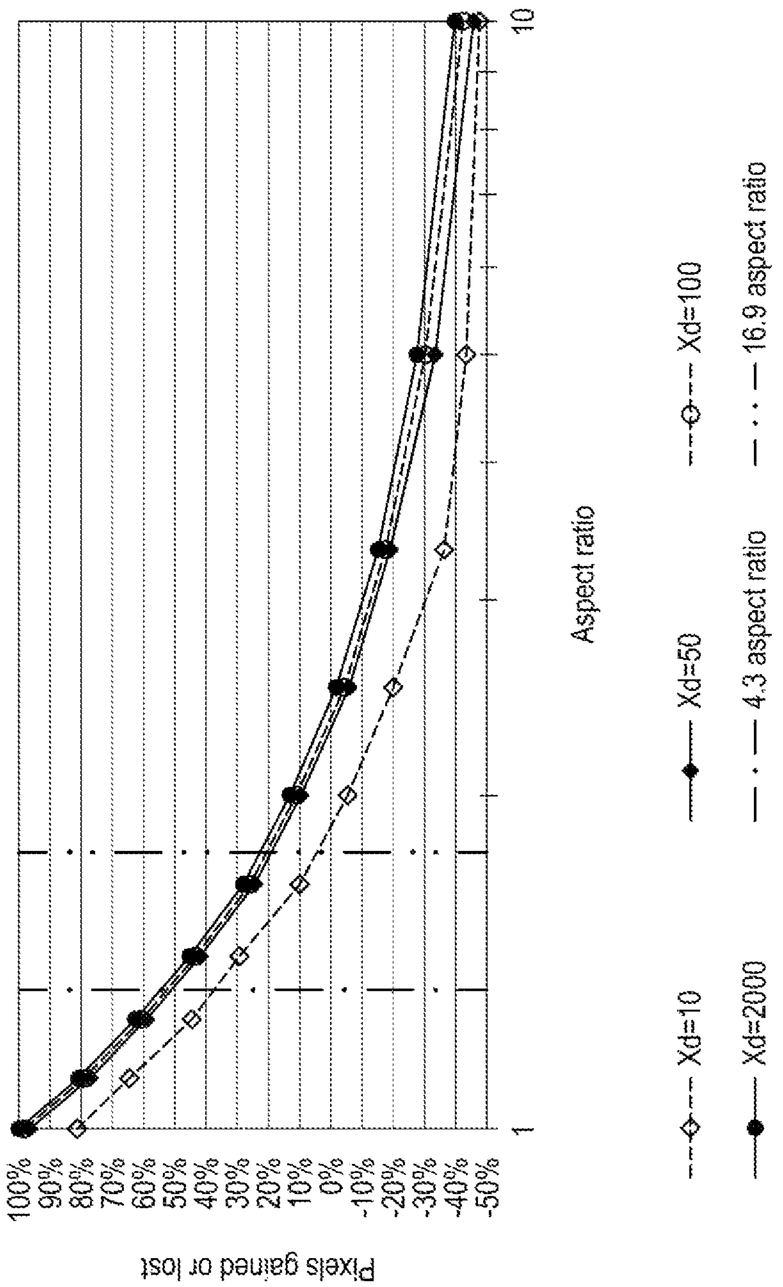
FIG. 8 illustrates the gain or loss in number of pixels as a function of aspect ratio for the present invention.

FIG. 8 Illustrates the gain or loss (Gpix) as a function of aspect ratio (Xd/Yd) of the diagonally addressed matrix. The nearest match is used for the aspect ratio (Xr/Yr) for the closest standard arrangement. Curves are shown for (Xd=10, 50, 100, and 2000). With increasing numbers of pixels, which is equivalent to increasing (Xd) for a given aspect ratio, the curves approach a limit that is very close to the curve for (Xd=2000). Also shown in FIG. 8 are dash-dotted lines indicating the popular aspect ratios of (4:3) and (16:9). The highest gain approaching one-hundred percent (100%) is achieved for square displays. The pixel gain (Gpix) at (4:3) aspect ratio is about fifty percent (50%) and at (16:9) aspect ratio (Gpix) is twenty percent (20%). Once the aspect ratio exceeds two, (Gpix) becomes negligible and eventually turns into a net loss of addressable pixels. A slight loss in the number of addressable pixels may be acceptable if a "frameless display" design is a design requirement.

Figure 9:
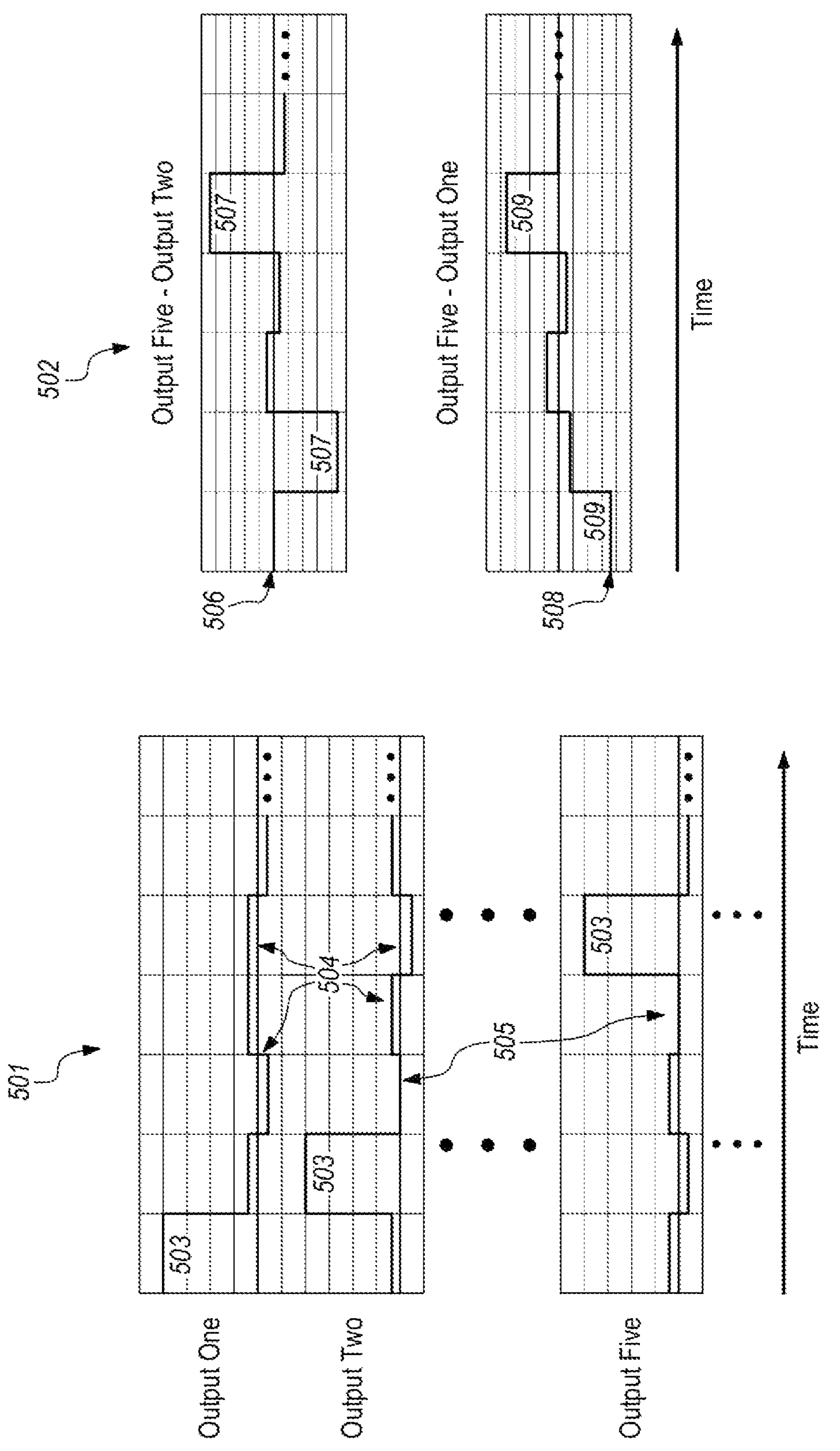
FIG. 9 shows exemplary waveforms applied to three outputs and the resulting waveforms at the respective pixel locations.

FIG. 9 shows exemplary waveforms forms 501 for Outputs One, Two, and Five and resulting waveforms 502 for the pixels formed by the overlap of traces Five and Two, as well as Five and One. The common pulse 503 is applied during a first time period by Output One, during a second time period by Output Two, during a fifth time period by Output Five. During all other times the outputs present either a segment voltage 504 with the same or opposite polarity of the common pulse depending on the desired state of the pixel, or a no-data voltage 505 whenever there is no crossing between the two traces in the given layout. The resulting waveform 506 at the overlap of traces connected to Outputs Two and Five has a high selection voltage 507, which may drive a pixel into a selected state. The resulting waveform 508 at the overlap of traces connected to Outputs One and Five has a low selection voltage 509, which may drive a pixel into a non-selected state.

Figure 10:
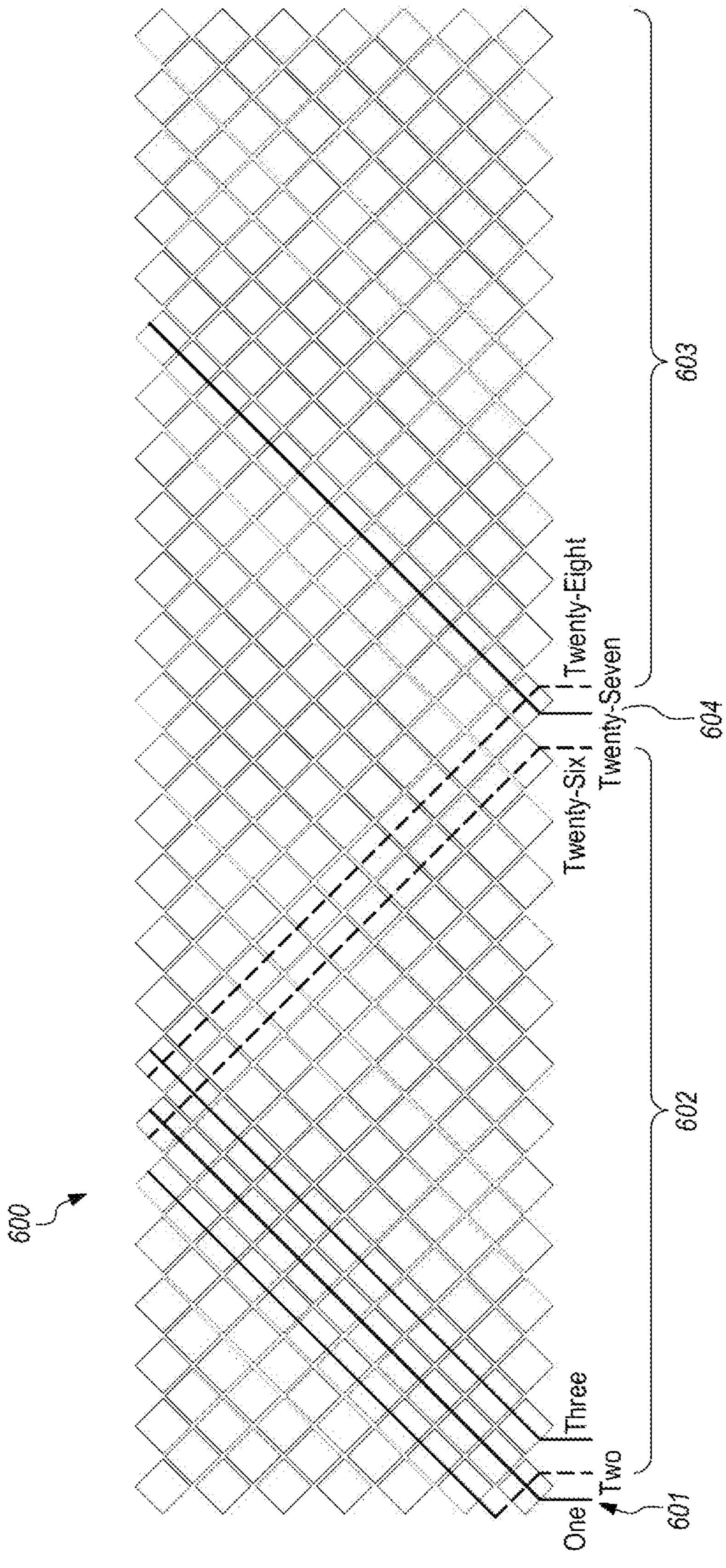
FIG. 10 illustrates driving separate portions of a display simultaneously.

If the aspect ratio exceeds two, two scan pulses or row signals can simultaneously be scanned through the display as the respective diagonals do not meet each other. While the pixel array is continuous, electrically it is as if two separate displays are being addressed simultaneously. FIG. 10 shows a diagonal pixel array 600 with an aspect ratio of (25:7=3.57). When Output One 601 applies the common signal, Outputs Two through Twenty-Six 602 are providing the data voltage for the pixels selected by the common signal on Output One 601. As can be seen, Outputs Twenty-Seven 604 and higher 603 are completely independent from any pixel addressed by Output One 601. Therefore, Output Twenty-Seven 604 can apply a common signal simultaneously with Output One 601 and Outputs Twenty-Eight and higher 603 can apply data voltages for the common signal on output 604 without impact on any pixels being addressed by Outputs One 601 and Two trough Twenty-Six. Subsequently Outputs Two and Twenty-Eight, then Three and Twenty-Nine, and so on can apply simultaneous common signals.

The time to address one frame, meaning apply one scan pulse to each output, is the number of scanned outputs times the slot time, or scan pulse duration allowed, for each output. In case of standard addressing the frame time (Ts) is a function of the slot time in standard addressing (ts) and the number of rows (Ys). In diagonal addressing the frame time (Td) is a function of the slot time in diagonal addressing (td) and either the number of outputs, which equals twice the number of pixels connected to the driver (i.e. 2*Xd) or four times the number of pixels in the first column (Yd) minus 2, whichever is smaller:

$$Ts=Ys*ts \quad (3)$$

$$Td=\mathrm{Min}[2*Xd,4*Yd-2]*td \quad (4)$$

In standard addressing each pixel gets scanned once during one frame, a frame being a scan through all row driver outputs. In diagonal addressing each pixel gets scanned twice during one frame. Hence (td) can be half the duration of (ts) for the same effect on the liquid crystal medium. The resulting increase in scan time (S) using diagonal addressing compared to standard addressing is therefore:

$$S = \frac{Td}{Ts} = \frac{\text{Min}[2 * Xd, 4 * Yd - 2] * \frac{1}{2} ts}{Ys * ts} \tag{5}$$

Figure 11:
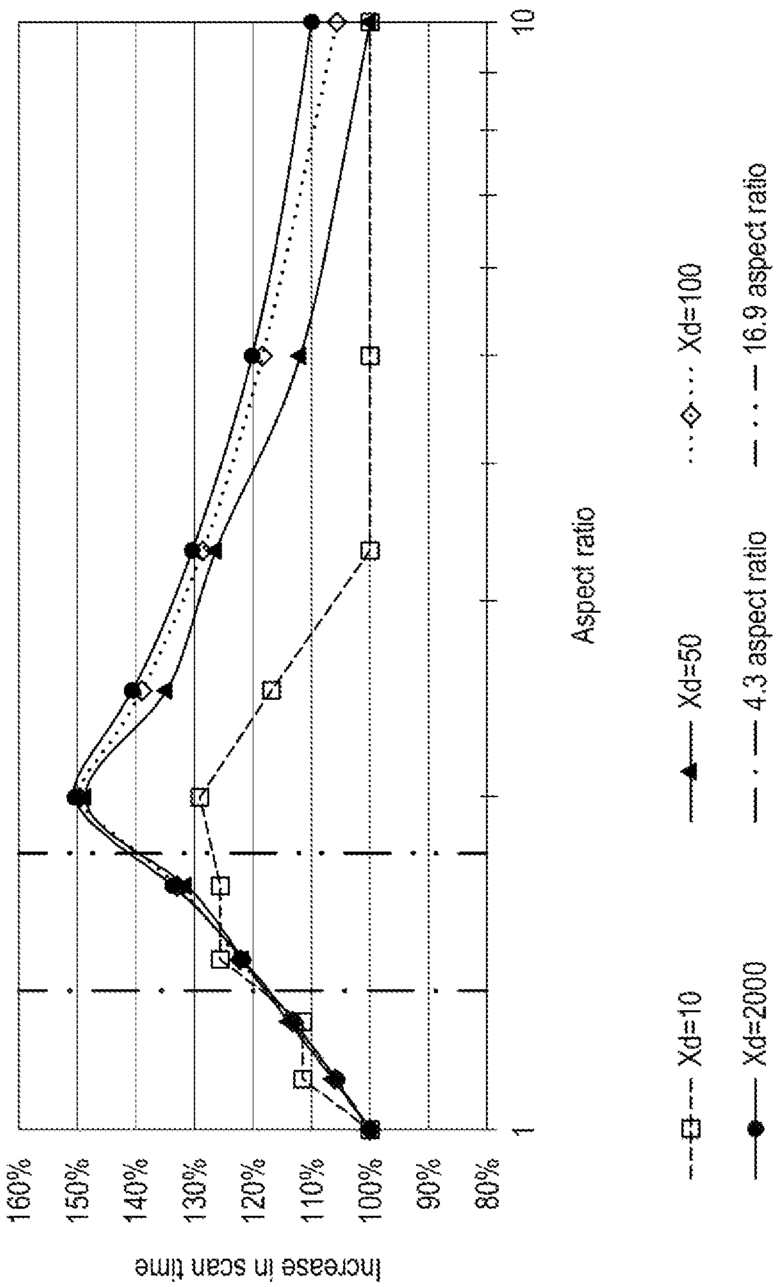
FIG. 11 illustrates the increase in time it takes to address the same number of pixels according to the present invention versus prior art addressing.

FIG. 11 shows a graphical representation of function (5) for Xd=10, 50, 100, and 2000 as a function of aspect ratio (Xd/Yd) of the diagonally addressed pixel matrix. Again, the nearest match is used for the aspect ratio (Xr/Yr) for the closest standard arrangement. For square displays (i.e., aspect ratio=1) the frame time for standard addressing and diagonal addressing is the same. The relative frame time for diagonal addressing increases to one-hundred and fifty percent at an aspect ratio of two, before decreasing again to the same frame time as for standard addressing at higher aspect ratios.

Some display media such as liquid crystals in twisted nematic (TN) or super twisted nematic (STN) displays respond to the root mean square (RMS) voltage of the resulting waveform at the overlap of two traces. Due to the square function, polarity does not matter, only amplitude matters. In a standard addressing scheme, the resulting pixel waveform is made up from (N-1) time periods of segment voltage, where N is the number of rows and one time period of either a selection pulse, which is the common voltage plus the segment voltage, or a non-selection pulse, which is the common voltage minus the segment voltage. It is known to one of skill in the art that the highest possible ratio of the RMS voltages of a selected pixel divided by the RMS voltage for a non-selected pixel depends only on the number of rows (N) being addressed. This is known as the selection ratio (S) at the multiplex limit as given by:

$$S = \text{Max}\left(\frac{Vrms, sel}{Vrms, nsel}\right) = \left[\frac{\sqrt{N}+1}{\sqrt{N}-1}\right]^{\frac{1}{2}} \tag{6}$$

The maximum selection ratio occurs when the ratio between the common voltage and the segment voltage, called the bias ratio (B) equals the square root of the number of rows (N):

$$B = \frac{\text{Vcommon}}{\text{Vsegment}} = \sqrt{N} \tag{7}$$

The RMS voltage of the resulting waveform of each pixel is independent of the state the other pixels are being driven to. Therefore, a liquid crystal arrangement that has a threshold RMS voltage under which it does not respond and a steep enough response to the applied RMS voltage, steeper than the ratio in function (6), can be addressed with this standard multiplex method. Because the RMS voltage of one pixel is independent of all other pixels, it is also possible to drive the display to intermediate voltage levels allowing for a gray scale.

However, in diagonal multiplex addressing, the resulting waveform at a crossover of two traces can have additional voltage levels compared to standard multiplex addressing. This is due to the fact that each pixel gets selected with a common pulse twice and because there are time periods when no pixels that is connected with the current common electrode needs to be addressed. The additional voltage levels are 0V and two times the segment voltage (Vd). The resulting RMS voltage depends on the position of the pixel in the array at a distance from the corners and on the state of other pixels in the image. The selection ratio (S) needs to be replaced with a new selection ratio (S sub d) for diagonal addressing for the worst-case position, which are the corners, and the worst-case image content as follows:

$$S\ sub\ d = \frac{\text{Min}\ (Vrmssel)}{\text{Max}\ (Vrmsnsel)} \tag{8}$$

The resulting RMS voltage on a pixel in diagonal addressing can be calculated by examining the voltage levels that are possible during the individual time slots of a scan as a function of image content, position of the pixel, and number of rows N in the array. The relationship between the selection time (td) and the frame time (Td) is given in function (4). For a single scan there are two selection pulses, either with +/− select voltage (Vs) or with +/− non-select voltage (Vns). For the number of driver outputs (P=2*Xd), there will remain (P-2) time slots, at which the pixels experiences either 0V, the segment voltage +/−(Vd), or twice the segment voltage +/−(2*Vd). 0V can be the result of both outputs not addressing any physical pixels at this time or both having the same polarity of the segment voltage (Vd). The segment voltage (Vd) results from one output applying a positive or negative segment voltage, while the other is not addressing a physical pixel and puts out 0V. Twice the segment voltage results from the two outputs having opposite polarity in their segment voltage (Vd).

It is characteristic that the RMS voltage of the corner pixels in a diagonal addressing array is impacted the most by the image content of the other pixels in the array. Hence it is necessary to find the selection ratio for a diagonal array (Sd) as shown in function (8) for corner pixels. In addition to the two time slots with selection pulses, each corner pixel will also have one time slot with +/−(Vd) and several timeslots with +/−(2Vd), which can appear (0 to N-2 times), where (N) is the number of rows in the array. The balance is always time slots with 0V.

Therefore function 8 becomes:

$$S\ sub\ d = \frac{\text{Min}\ (Vrmssel)}{\text{Max}\ (Vrmsnsel)} = \frac{\sqrt{\frac{V_d^2 + 2(V_S + V_d)^2}{P}}}{\sqrt{\frac{V_d^2 + 2(V_S - V_d)^2 + (n-2)(2V_d)^{\wedge 2}}{P}}} \tag{9}$$

The bias ratio (B sub d) for diagonal addressing defines the relationship between ($V_S$) and (B sub d) as follows:

$$B\ sub\ d = \frac{V_S}{V_d} \tag{10}$$

The selection ratio is a function of (B sub d). The maximum selection ratio is achieved at a specific value of (B sub d (n)), which is a function of the number of rows (n):

$$S\ sub\ d = \frac{\sqrt{\frac{V_d^2 + 2(B_d V_d + V_d)^2}{P}}}{\sqrt{\frac{V_d^2 + 2(B_d V_d - V_d)^2 + (n-2)(2V_d)^2}{P}}} = \sqrt{\frac{2B_d^2 + 4B_d + 3}{2B_d^2 - 4B_d + 4n - 5}} \tag{11}$$

Figure 12:
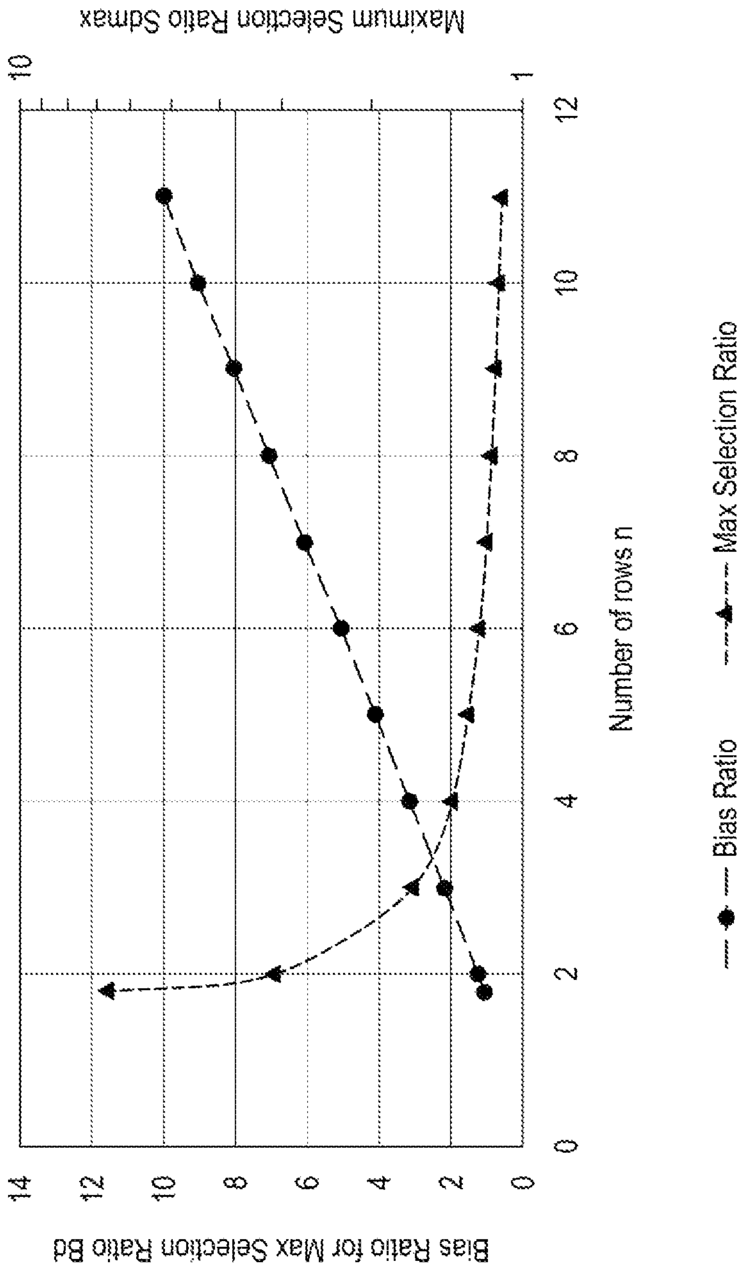
FIG. 12 shows an exemplary bias ratio and resulting maximum selection ratio for the present invention.

FIG. 12 shows the dependence of the maximum selection ratio (S sub dmax) as a function of the number of rows (n) and the corresponding bias ratio (B sub d). All the values for the selection ratio are greater than one, hence this scheme can address liquid crystal configurations responding to RMS voltage levels. However, due to the fact that each pixel RMS voltage can fall within a range of values determined by the states of all the other pixels (crosstalk), this embodiment is limited to black and white displays that can be driven into saturation.

Figure 13:
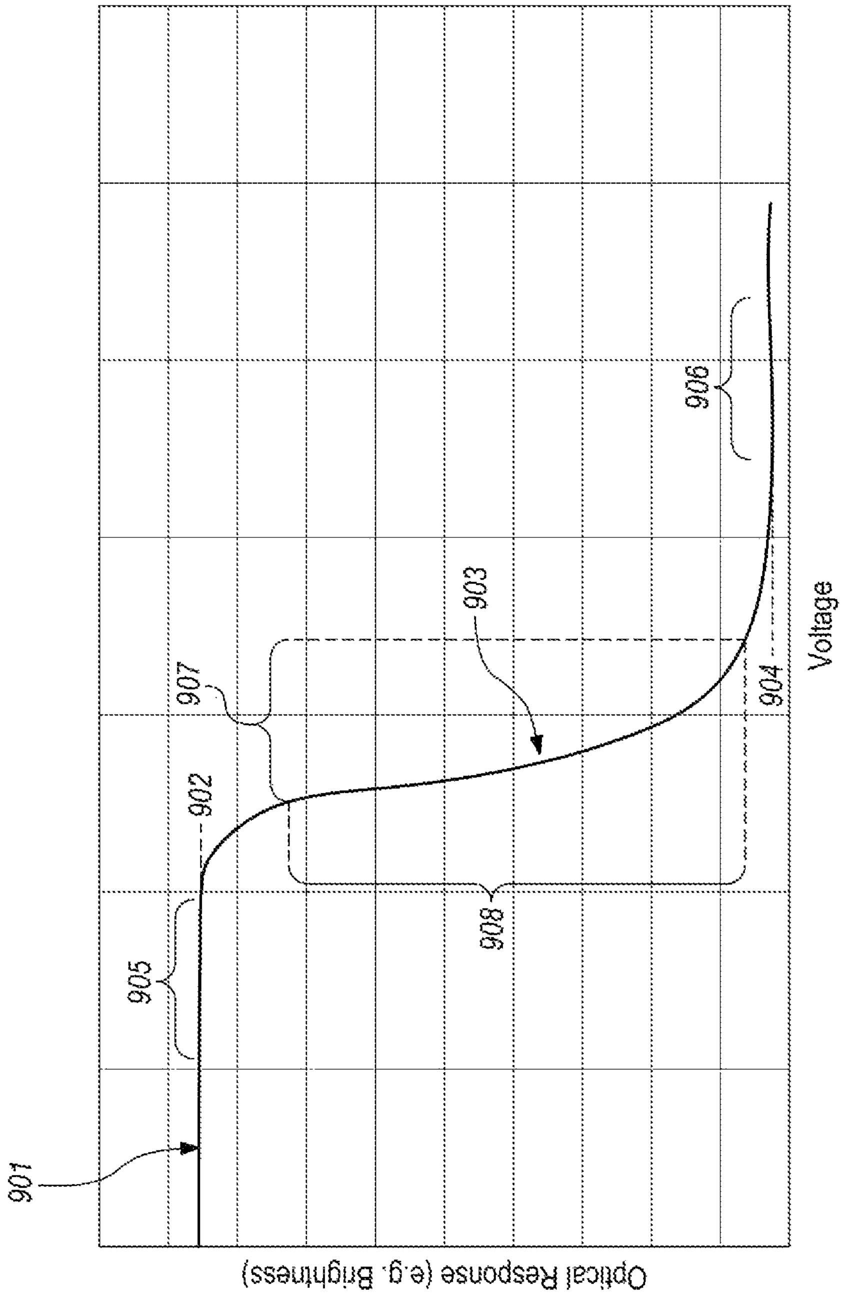
FIG. 13 shows an exemplary electro-optical response curve for a display.

FIG. 13 illustrates the reason for the limitation to black and white displays. The electro-optic response curve 901, which is brightness as a function of RMS voltage, remains at a constant bright level 902 and then transitions through the gray shades 903 to a constant dark level 904. One of skill in the art will know that equivalent optical configurations can be chosen where the transition is from dark to bright. A voltage range 905 in the low voltage domain does not result in a variation of bright level 902, nor does a voltage range on the high voltage domain 906 change the dark level 904. However, a voltage range in the transition domain 907 will lead to a gray level range 908.

Figure 14:
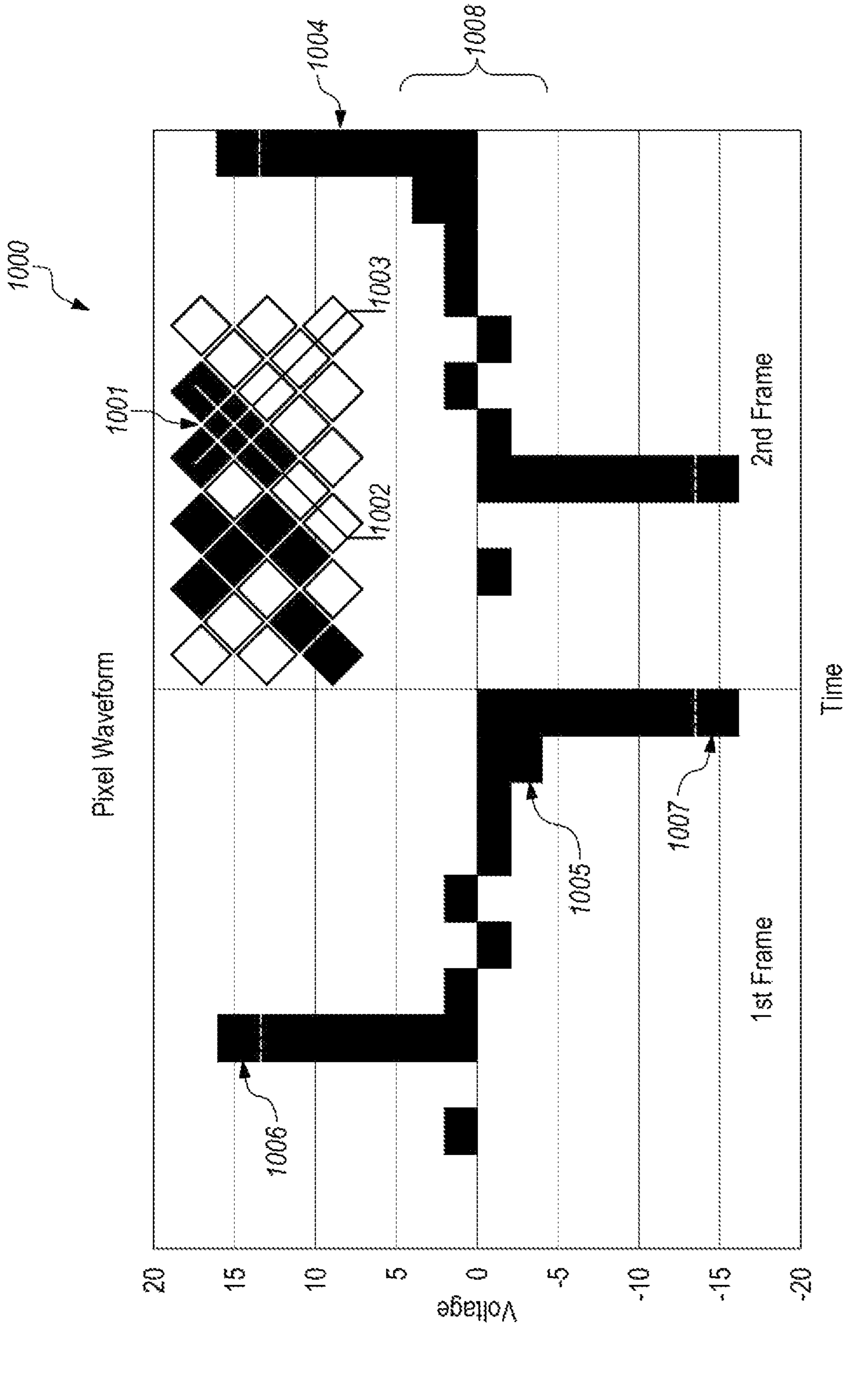
FIG. 14 illustrates the pixel wave form on the example of a smaller eleven by five diagonal pixel array.

FIG. 14 illustrates the pixel wave form on the example of a smaller (11×5) diagonal pixel array 1000. Pixel 1001 is driven by outputs 1002 and 1003. The resulting waveform at pixel 1001 is shown in the diagram 1004 for the overall pattern as indicated in diagonal pixel array 1000. The second frame is shown for the same image and is an option to balance out any DC voltage by inverting the second frame. There is a small DC component in a single frame due to the 4V pulse 1005. All other pulses cancel each other. The selection pulses 1006 and 1007 for both states of a pixel have different amplitudes to drive select and non-select states, but always have the same sequence of polarity, e.g., first positive than negative in the first frame for all pixels of the display, independent of information content. This means that diagonal addressing scheme is suitable for any display technology requiring a certain polarity of the addressing pulses, such as ferroelectric displays, electrochromic displays, redox displays, displays switching based on the electroclinic effect including ZBD displays, and electrophoretic displays, e.g., all displays where the applied voltage or electric field causes the electrooptic effect, rather than the RMS voltage as in TN/STN type displays. The only condition is that the technology must have a threshold voltage under which the applied signal does not affect the outcome of the switching. The threshold voltage range must be larger than the voltage range of the chatter 1008 from addressing the other pixels.

In another embodiment, this invention can also be used to control elements in a pixel circuit that allows a current to flow when a large enough pulse is applied, but not if a smaller pulse is applied. Similarly, the current may flow only in one direction or in both directions depending on polarity of the pulse. This allows addressing light emitting diode displays, such as OLED or any type of solid-state LED displays.

One example of such a display with a large threshold that responds to the polarity of the applied signal is a zero-field zenithal bistable display (ZBD). In a ZBD, the bi-stability is created by a competition of preferred liquid crystal alignments on a grating structure, which forces discontinuities, referred to as 'defects', in the liquid crystal director configuration that are stable, meaning anchored to a location on the surface. The type and location of these defects can be controlled via the electroclinic effect. That is, after applying a sufficiently large positive pulse the liquid crystal relaxes into one stable state, e.g., the black state, while after application of a sufficiently large negative pulse the liquid crystal relaxes into another stable state, e.g., the white state. The pixels that have to change to white can be driven with a sufficiently large pules in the first frame, which ends with a negative pulse, while pixels that need to be changed to black are driven with a sufficiently large pulse in the second frame, which ends with a positive pulse. Pixels that don't need to change are addressed with small pulses only. In other embodiments, other methods can be used to drive such a display. For example, the display can be driven all white and/or black first, then only the pixels that need to change are driven. One or several outputs ahead of the one that is being selected currently can be driven with a signal forcing all pixels that will soon be addressed into one defined state.

A display medium without an inherent threshold can still be driven with diagonal addressing if a threshold is created by an active switching element in the pixel, such as a diode like a metal-insulator-metal diode or a thin film transistor. This concept is widely applied in active matrix displays (TFT displays) where the rows are connected to the gate of the thin film transistor and the columns are connected to the source. The drain is connected to the pixel that forms a capacitor with a common electrode. In diagonal addressing, each output can be the row and the column output. Hence there are suitably two transistors in a pixel arranged such that they alternate when being addressed.

Figure 15:
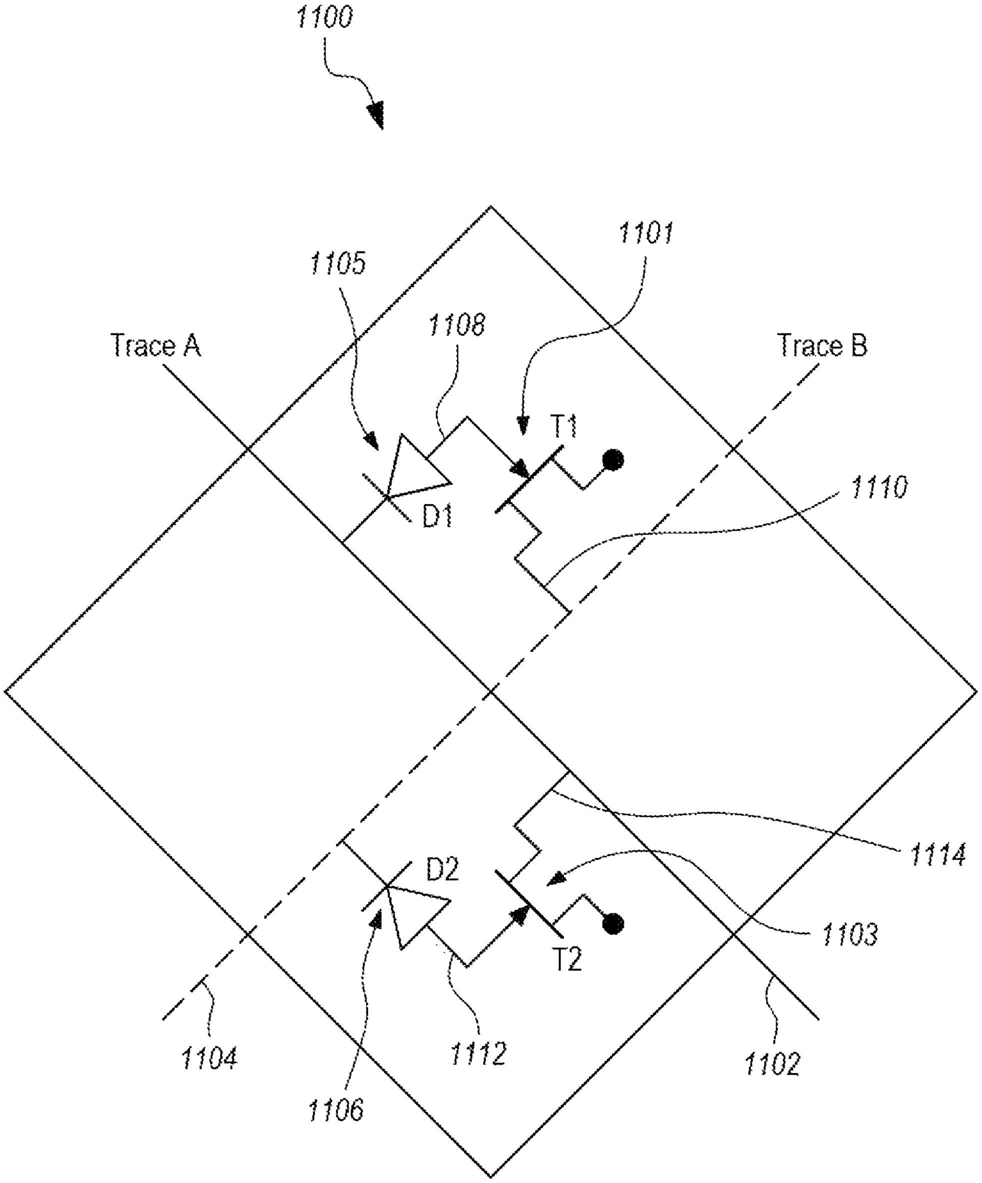
FIG. 15 shows an exemplary active-matrix pixel layout suitable for the present invention.

A pixel 1100 with first transistor 1101 and second transistor 1103 is illustrated in FIG. 15. First transistor 1101 is arranged such that its gate 1108 is connected to trace A 1102, while its source 1110 is connected to trace B 1104. The second transistor 1103 is arranged such that its gate 1112 is connected to trace B 1104, while its source 1114 is connected to trace A 1102. Depending on the characteristics of the transistor there may also need to be diodes 1105 and 1106 between the gates 1108 and 1112 and the traces 1102 and 1104. The drains of both transistors are connected to the pixel, or, in case of a current display, to the current driver circuit.

If trace A 1102 carries the gate signal, first transistor 1101 becomes conductive, and the source signal of trace B 1104 is applied to the pixel 1100. If trace B 1104 carries the gate signal, second transistor 1103 becomes conductive, and the source signal of trace A 1102 is applied to the pixel 1100. Such arrangement can be used for a display technology lacking a sufficient threshold, for example an electrophoretic display where charged particles will move in any applied field.

Figure 16:
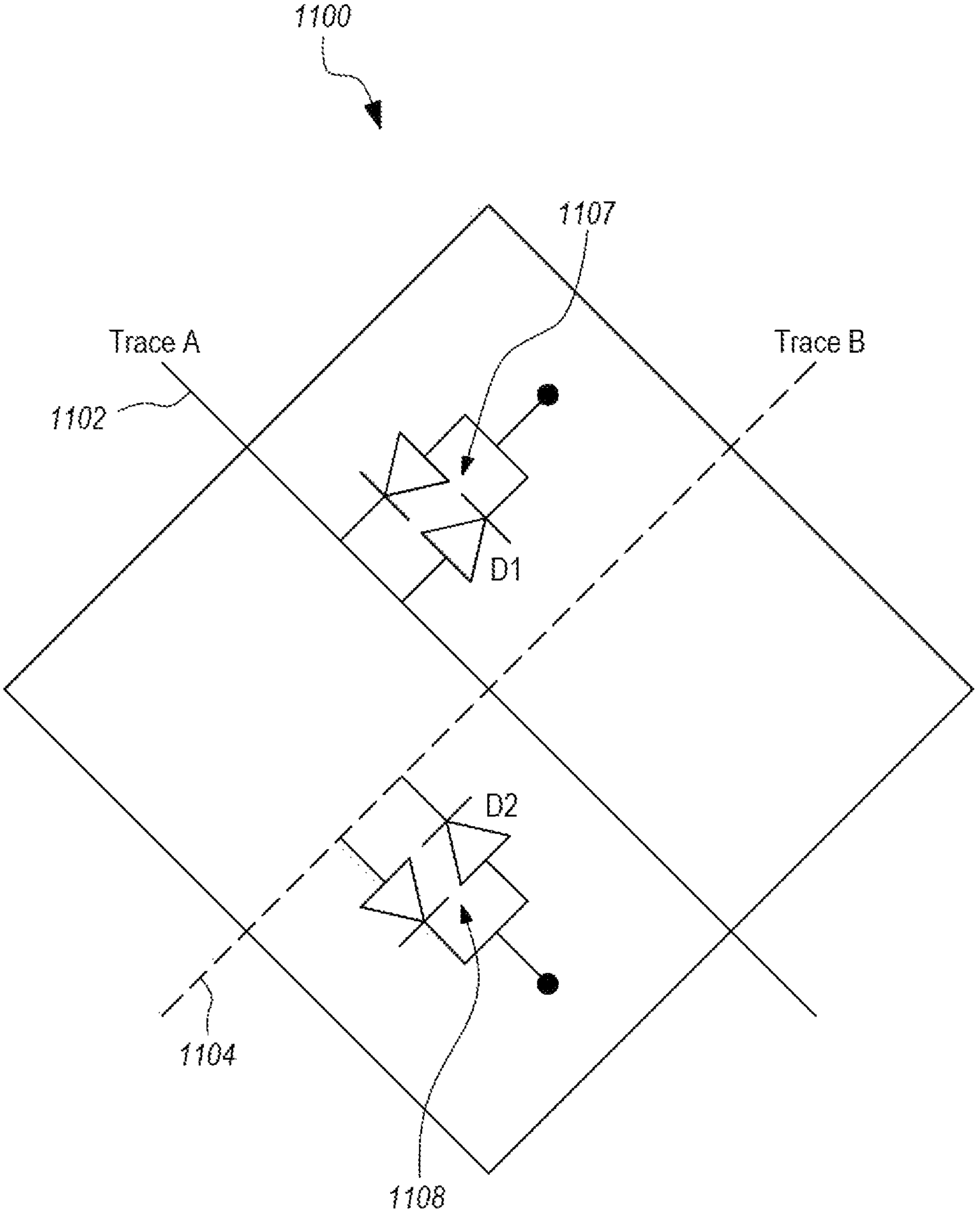
FIG. 16 shows another exemplary active-matrix pixel layout suitable for the present invention.

FIG. 16 shows an alternative approach to create a threshold in pixel 1100. This is the application of thin film diode technology (TFD) to diagonal addressing. Pixel 1100 comprises a bidirectional diode 1107, such as a metal-insulator-metal diode, connected to trace A 1102, and a second bidirectional diode 1108 connected to trace B 1104. Both bidirectional diodes 1107 and 1108 are connected to the pixel 1100. The effect of such an arrangement is that only sufficiently large voltages of either polarity can pass, while smaller voltages are blocked by the bidirectional diodes 1107 and 1108. Both bidirectional diodes 1107 and 1108 are necessary as either trace may carry the selection pulse.

In case of such an active matrix implementation of diagonal addressing, the signal lines may all be on the same substrate but on different levels separated by an insulator. The bridging from one substrate to the other at the edge of the display when reflecting into the opposite diagonal is replaced by vias through the insulating layer. The concept of reflection into the opposite diagonal remains, only without the electric contact being transferred to the other substrate.

Figure 17:
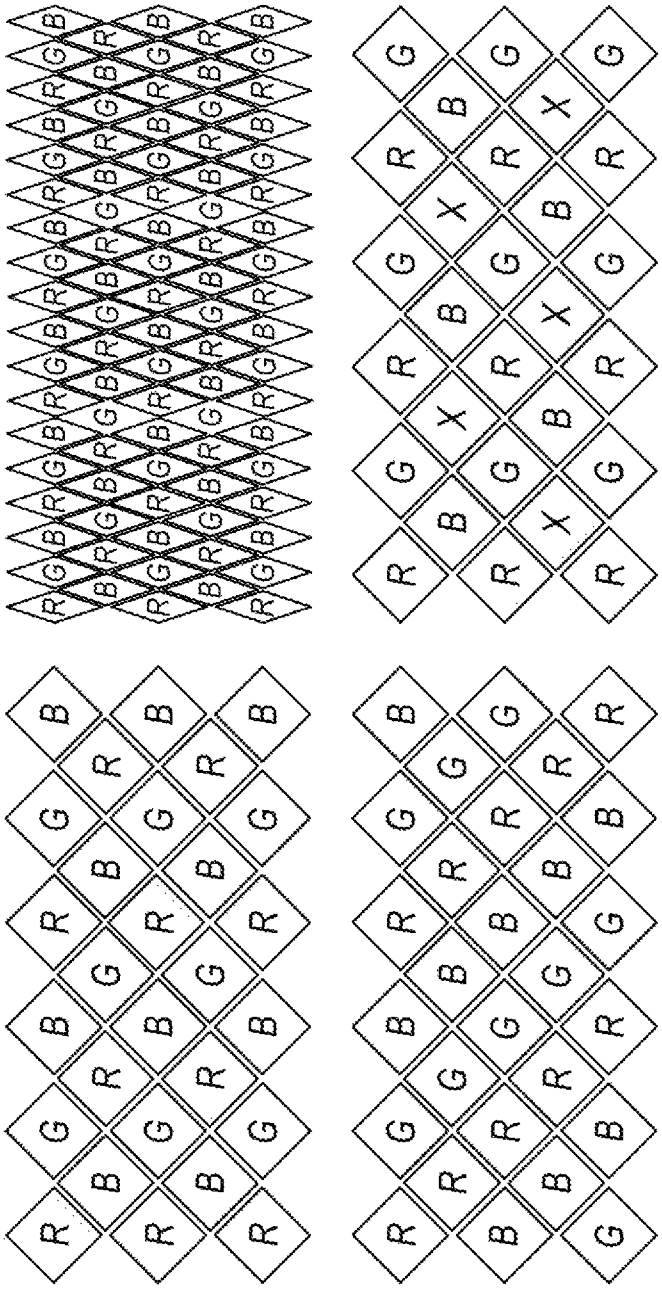
FIG. 17 shows four exemplary embodiments of color filter arrangements that can be used with the present invention.

Diagonal addressing is compatible with color displays. Rather than subdividing standard arrangement pixels into stripes of color, here color filters are suitably arranged in diagonal format as well. FIG. 17 shows four examples of suitable arrangements of color filters for a diagonal pixel array, which are meant as examples of embodiments, not as limiting options. R, G, and B in FIG. 17 stand for red, green, and blue. X stands for a $4^{th}$ color, which for example, can be white or a second, different shade of green.

Figure 18:
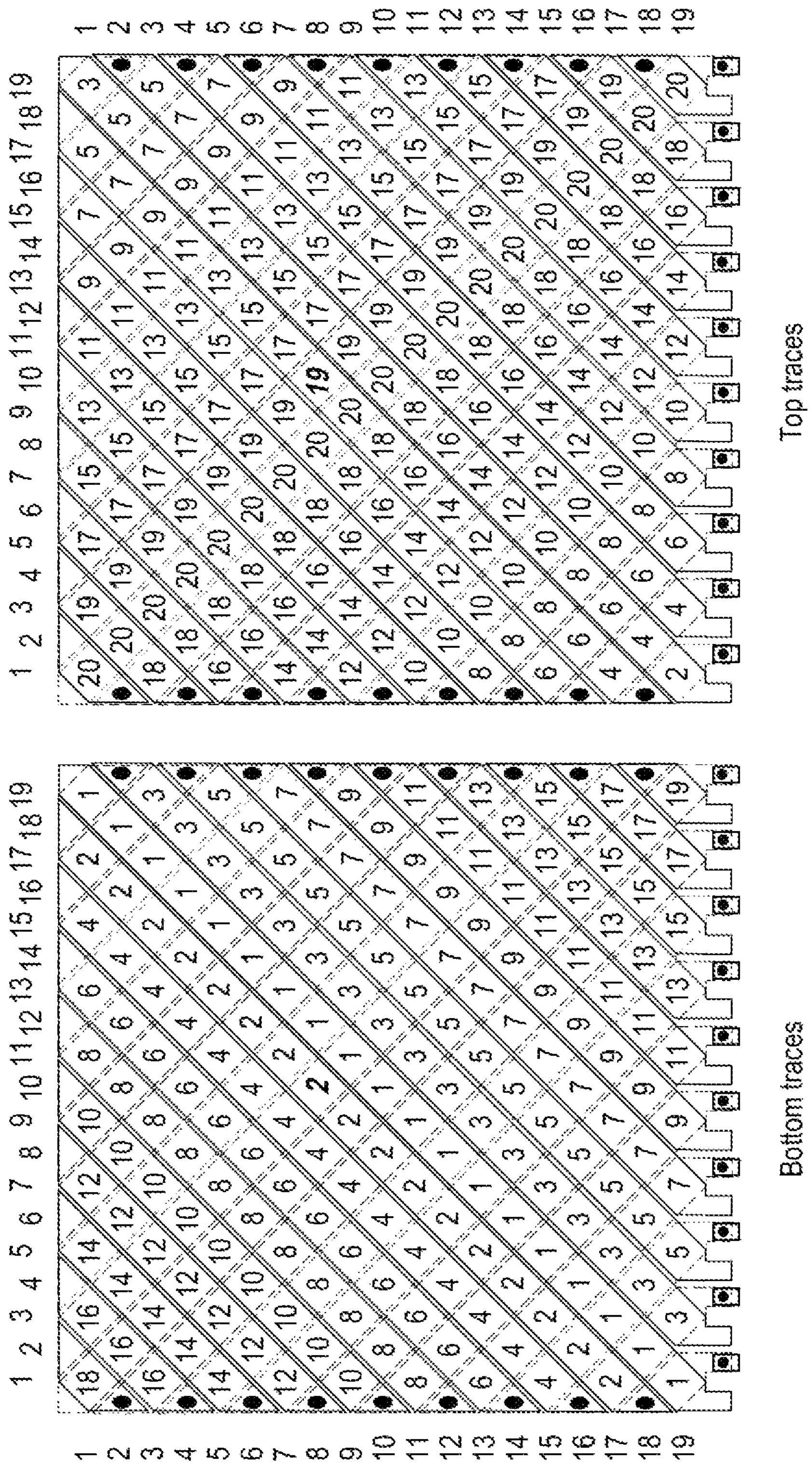
FIG. 18 shows an exemplary embodiment of lookup tables for the array in FIG. 7.

It is possible to arrange pixels in image capturing equipment in a diagonal fashion as well, but most image sources are in a standard, or Cartesian, grid arrangement. This requires scaling and mapping of the source image to a diagonal pixel grid which can be done using existing graphics computing algorithms and hardware. Independent of any such image mapping and scaling, a second mapping step is required as pixels are no longer addressed by a row and column. This mapping step is specific to the display layout and hence suitably implemented in programmable display drivers. A display layout specific look-up table or transformation function is necessary to relate a row and column address of a pixel in the source image into the two driver outputs that will address this pixel. Such a look-up table or transformation function can be added to a driver for diagonal addressing, for example, in a one-time programmable memory. FIG. 18 shows an example of the lookup table for the array from FIG. 7. The look-up table shows that for this display a pixel at the Cartesian location 10,8 (column 10, row 8) would be addressed with outputs 2 and 19.

As mentioned above, display drivers for diagonal addressing must have the capability for each output to assume either the row driver characteristic, the column driver characteristic, or a third state that is applied when the output is not addressing an existing pixel. The third state may be a fixed voltage, such as 0V or any other voltage, or it may be a high impedance state, causing the respective trace to float to a voltage defined by capacitive effects in the display. Such capability may be added to existing display driver designs by adding an output switch stage that can connect the physical outputs of a driver chip with either the internal row or column driver outputs and either a high impedance state or a fixed voltage. Common display drivers may either be dedicated row and dedicated column drivers or they may be integrated drivers having blocks of outputs for rows and for columns, respectively. Integrated drivers often also contain a timing controller, image memory, and other functions. For diagonal addressing, drivers would always be integrated row/column drivers and driver/controllers would suitably also incorporate the look-up function.

Figure 19:
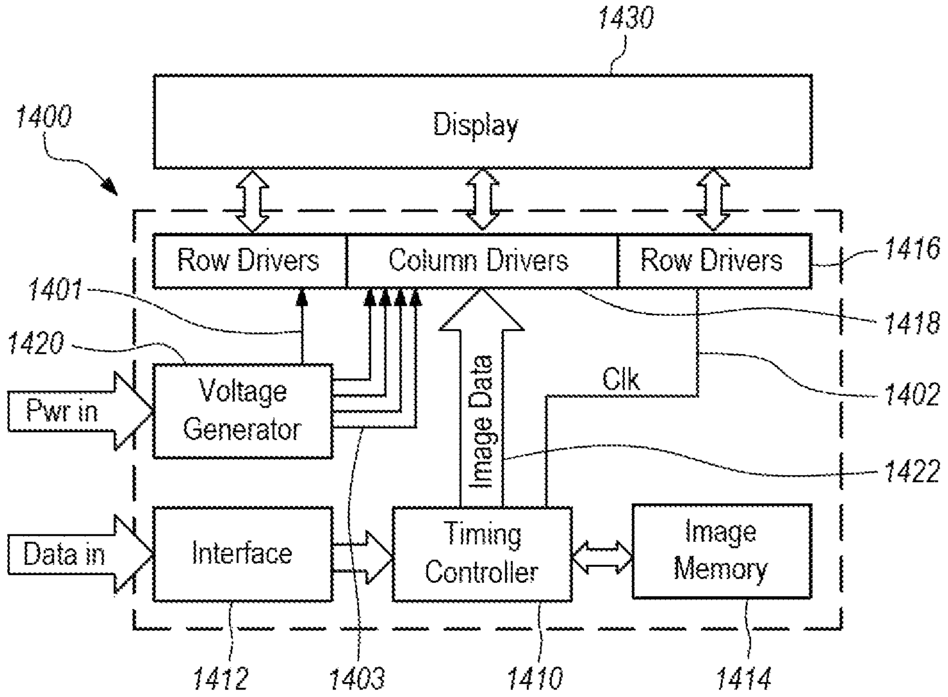
FIG. 19 (Prior Art)
FIG. 19 shows a block diagram of a typical passive matrix LCD driver according to prior art.

FIG. 19 shows an exemplary simplified block diagram for an integrated passive matrix liquid crystal display driver-controller 1400 according to the prior art. Ancillary functions such as temperature compensation and a temperature sensor are omitted. Data and commands are received by the timing controller 1410 via the interface 1412. The timing controller 1410 interprets the commands and stores the image data 1422 in the memory 1414. The timing controller 1410 also generates timing signals. The voltage generator 1420 creates the voltage levels required for the display 1430 including the row signal 1401. Row drivers 1416 are essentially shift registers that apply the row signal 1401 to one output at a time, shifting to the next output with each clock pulse 1402 received from the timing controller 1410. Column drivers 1418 receive image data 1422 from the timing controller 1410 for each output and apply the voltage levels 1403 from the voltage generator 1420 according to the image data 1422 for the row currently being addressed.

Figure 20:
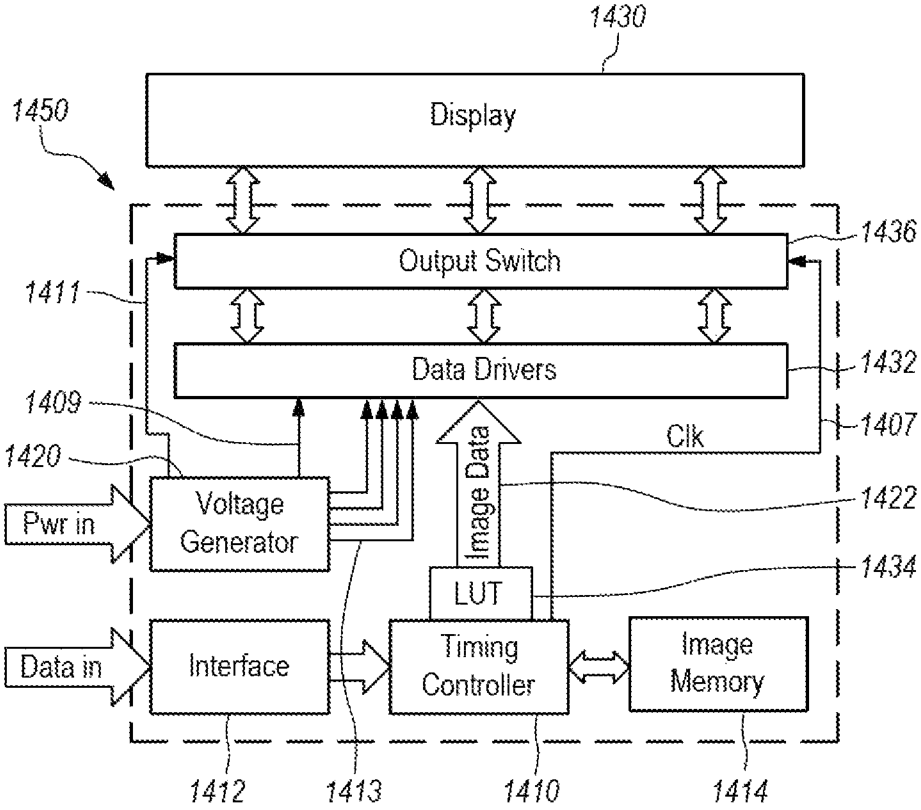
FIG. 20 shows a block diagram of a passive matrix LCD driver for diagonal addressing according to the present invention.

FIG. 20 illustrates an exemplary simplified block diagram for an integrated driver-controller 1450, which is capable of diagonal addressing according to the present invention. Ancillary functions such as temperature compensation and a temperature sensor are omitted. Data and commands are received by the timing controller 1410 via the interface 1412. The timing controller 1410 interprets the commands and stores the image data 1422 in the memory 1414. The timing controller 1410 also generates timing signals. The voltage generator 1420 creates the voltage levels required for the display 1430 including the row signal 1411 and all necessary voltage levels for the data drivers 1432, which also include a voltage level for no-data signals 1409. The timing controller 1410 takes image data 1422 from the memory 1414 and translates it via the look-up table (LUT) 1434 into image data suitable for the display 1430 that is being addressed. Alternatively, the timing controller may apply the look up table when receiving image data and storing it in the memory in the format suitable for the diagonal display. The data drivers 1432 apply voltages 1413 to their outputs according to the image content, and voltage 1409 if no pixel is being addressed by the respective output. The data driver 1432 outputs are connected to the display 1430 via the output switch 1436, which can assume at least two states for each output. The output switch 1436 comprises a shift register that connects one output at a time to the row signal 1411 and shifts that output to a neighbor with every pulse of the clock signal 1407. All other outputs that are not actively driving a row signal are connected with the respective data driver outputs. Optionally, the output switch 1436 may also set the respective IC outputs to high impedance whenever the data drivers apply no-data voltage 1414.

Figure 21:
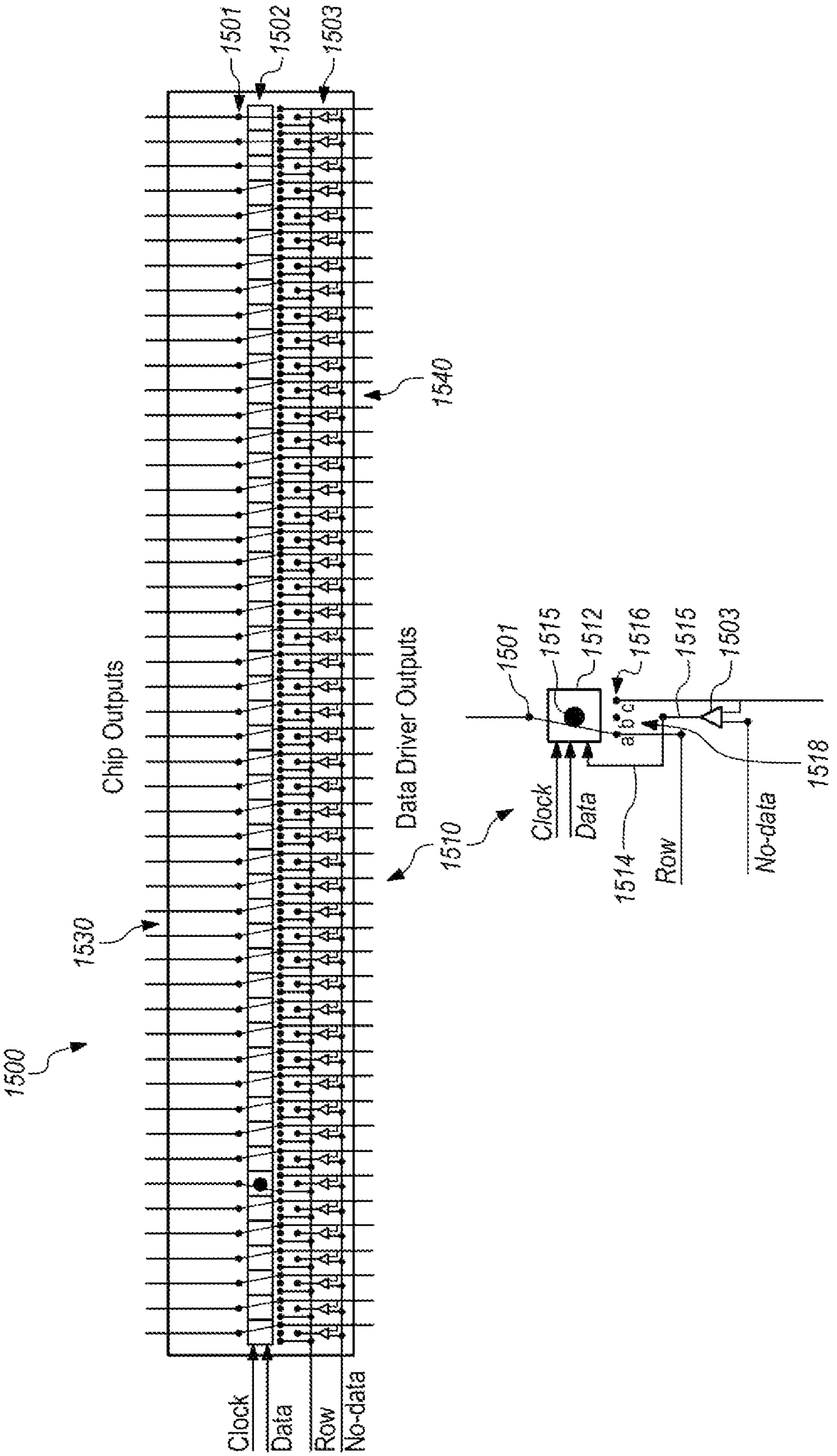
FIG. 21 shows one exemplary embodiment of an output switch for a diagonal addressing driver based on a shift register.

FIG. 21 shows one exemplary embodiment of an output switch 1500 which can be used as output switch 1436 in FIG. 20 with multiple channels 1510 and chip outputs 1530. Each chip output 1530 is connected with a switching element 1501, which is controlled by shift register 1502. Optionally, comparators 1503 may be added to compare the data driver outputs 1540 with the no-data signal. Switch 1501 can assume at least two positions, Position A 1514 and Position C 1516, and optionally a third Position B 1518, which is not connected to anything and hence allows the chip output to float. The presence of a bit 1515 in the corresponding shift register element 1512 causes switch 1501 to assume Position A 1514, thereby connecting the chip output 1530 with the row signal. Absence of a bit 1515 causes switch 1501 to assume Position C 1516 that connects the chip output 1530 with the data driver output 1540 providing the image dependent signal. Optionally, comparator 1503 may compare the data driver output 1540 with the no-data signal and if the levels are the same, the comparator output 1515 may cause the switch 1501 to assume the high impedance Position B 1518.

Figure 22:
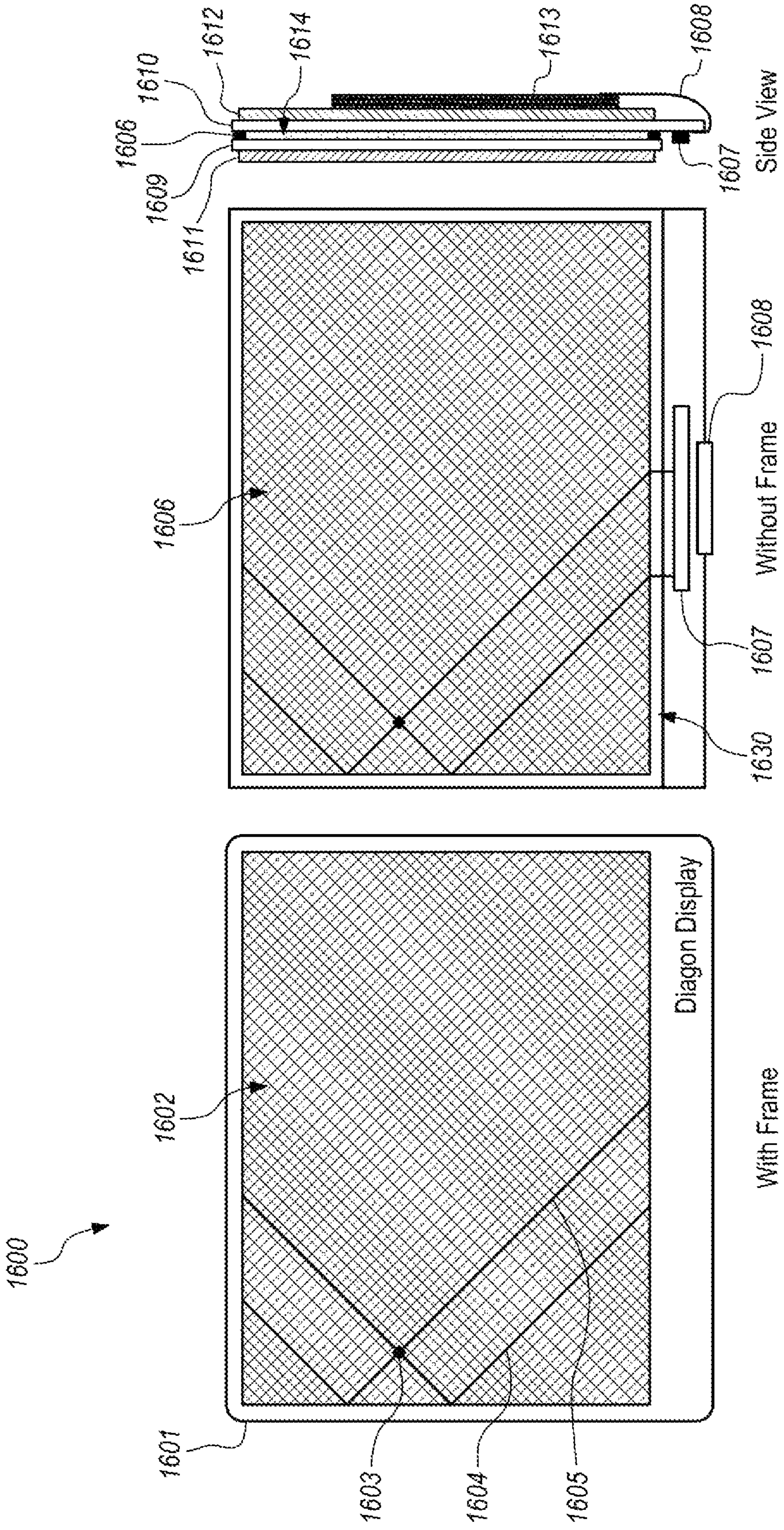
FIG. 22 shows an example embodiment of a display system using diagonal addressing according to the present invention.

FIG. 22 shows an exemplary display system 1600 with diagonal addressing. The electronic display 1602 of the display system 1600 is surrounded by a frame 1601 that is very narrow on three sides due to the lack of feeder lines running up and down the sides of the display system 1600. The electronic display 1602 is formed by pixels 1603 that have a higher count than the pixel count of a comparable Cartesian display with the same number of driver outputs. The pixels 1603 are formed by or connected with substantially diagonal electrodes 1604 and 1605, which are formed on substrates 1609 and 1610. The electrodes 1604 and 1605 connect only on the bottom edge 1630 of the electronic display 1602 to a driver chip 1607 and reflect when reaching either side of the electronic display 1602 to continue in the opposite diagonal and on the opposite substrate. Electric connection between electrodes 1604 and 1605 on either substrate is bridged by conductive particles in perimeter seal 1606. In various embodiments, electronic display 1602 can comprise a passive matrix display, an active matrix display, an emissive display, a transmissive display, a partially reflective display, an electrophoretic display a liquid crystal display, or a zenithal bi-stable display.

Driver chip 1607 is a driver chip capable of diagonal addressing, e.g., having functions as described in FIGS. 20 and 21. Substrates 1609 and 1610 may have additional active elements such as transistors or diodes, and other layers as required by the display medium 1606. Between substrates 1609 and 1610 and enclosed by perimeter seal 1606 is a display medium 1614, which fulfills the requirements for diagonal addressing. Display medium 1614 may be a liquid crystal, an electrophoretic medium, a light emitting medium, or other similar medium. On the outside of the substrates are further layers 1611 and 1612, which improve optical performance of the display system 1600. Such layer may for example be polarizers and reflectors. The connections to the driver 1607 are on the larger substrate 1610. The driver chip is connected to the display system electronics 1613 via a flexible circuit 1608.

Figure 23:
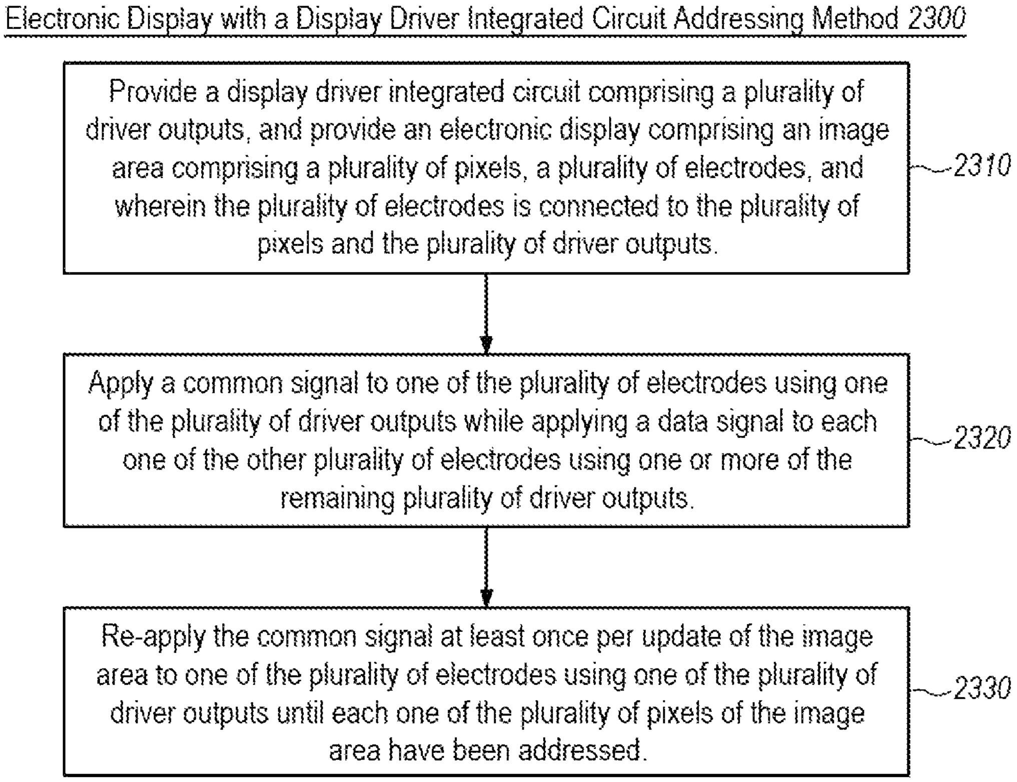
FIG. 23 shows a method of addressing an electronic display with a display driver integrated circuit.

FIG. 23 shows electronic display with a display driver integrated circuit addressing method 2300. Starting at step 2310, a display driver integrated circuit comprising a plurality of driver outputs is provided, and an electronic display is provided comprising an image area of a plurality of pixels and a plurality of electrodes connected to the plurality of pixels and the plurality of driver outputs. Then, at step 2320, a common signal is applied to one of the plurality of electrodes using one of the plurality of driver outputs while applying a data signal to each one of the other plurality of electrodes using one or more of the remaining plurality of driver outputs. At step 2330, the common signal is re-applied at least once per update of the image area to one of the plurality of electrodes using one of the plurality of driver outputs until each one of the plurality of pixels of the image area have been addressed.

In one embodiment, the plurality of electrodes provided in step 2310 are a plurality of diagonally arranged electrodes. In other embodiments, the electronic display provided in step 2310 can be a passive matrix display, an active matrix display, a zenithal bi-stable display, or an electrophoretic display.

While the invention has been specifically described in connection with certain specific embodiments thereof, it is to be understood that this is by way of illustration and not of limitation. Reasonable variations and modifications are possible within the scope of the foregoing disclosure and drawings without departing from the spirit of the invention.

What is claimed is:

1. A method of addressing a passive matrix electronic display with a display driver integrated circuit, the method comprising:
- providing a display driver integrated circuit comprising a plurality of driver outputs;
- providing a passive matrix electronic display comprising:
  - an image area comprising:
    - a plurality of pixels;
    - a plurality of electrodes; and
    - wherein the plurality of electrodes is connected to the plurality of pixels and the plurality of driver outputs;
- applying a common signal to at least one of the plurality of electrodes at a time using at least one of the plurality of driver outputs while applying a segment signal to each one of the other plurality of electrodes using one or more of the remaining plurality of driver outputs; and
- re-applying the common signal to at least one of the plurality of electrodes using at least one of the plurality of driver outputs until each one of the plurality of pixels of the image area have been addressed, wherein the common signal is applied to each of the plurality of driver outputs connected to the plurality of pixels at least once per update of the image area.

2. The method of claim 1 wherein the plurality of electrodes is a plurality of diagonally arranged electrodes.

3. The method of claim 1 wherein the passive matrix electronic display is a zenithal bi-stable display.

4. The method of claim 1 wherein the passive matrix electronic display is an electrophoretic display.

5. A method of addressing an active matrix electronic display with a display driver integrated circuit, the method comprising:
- providing a display driver integrated circuit comprising a plurality of driver outputs;
- providing an active matrix electronic display comprising:
  - an image area comprising:
    - a plurality of pixels;
    - a plurality of electrodes; and
    - wherein the plurality of electrodes is connected to the plurality of pixels and the plurality of driver outputs;
- applying a gate signal to at least one of the plurality of electrodes at a time using at least one of the plurality of driver outputs while applying a data signal to each one of the other plurality of electrodes using one or more of the remaining plurality of driver outputs; and
- re-applying the gate signal to at least one of the plurality of electrodes using at least one of the plurality of driver outputs until each one of the plurality of pixels of the image area have been addressed, wherein the gate signal is applied to each of the plurality of driver outputs connected to the plurality of pixels at least once per update of the image area.

6. The method of claim 5 wherein the plurality of electrodes is a plurality of diagonally arranged electrodes.

7. The method of claim 5 wherein the active matrix electronic display is a zenithal bi-stable display.

8. The method of claim 5 wherein the active matrix electronic display is an electrophoretic display.

* * * * *